(12) United States Patent
Garner et al.

(10) Patent No.: US 9,313,941 B2
(45) Date of Patent: *Apr. 19, 2016

(54) ALIGNMENT SYSTEM FOR A BLOCKING MEMBER OF A PLANTING UNIT

(71) Applicant: Deere & Company, Moline, IL (US)

(72) Inventors: Elijah B. Garner, Bettendorf, IA (US); Lee E. Zumdome, Bettendorf, IA (US)

(73) Assignee: Deere & Company, Moline, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/170,315

(22) Filed: Jan. 31, 2014

(65) Prior Publication Data

US 2014/0144357 A1    May 29, 2014

Related U.S. Application Data

(63) Continuation-in-part of application No. 13/072,175, filed on Mar. 25, 2011, now Pat. No. 8,671,856, which is a continuation-in-part of application No. 12/363,968, filed on Feb. 2, 2009, now Pat. No. 7,918,168.

(51) Int. Cl.
*A01C 7/04* (2006.01)
*A01C 7/16* (2006.01)
*A01C 7/20* (2006.01)

(52) U.S. Cl.
CPC . *A01C 7/042* (2013.01); *A01C 7/16* (2013.01); *A01C 7/20* (2013.01)

(58) Field of Classification Search
CPC ............ A01C 7/042; A01C 7/04; A01C 7/00; A01C 7/16; A01C 7/08; A01C 7/20
See application file for complete search history.

(56) References Cited

U.S. PATENT DOCUMENTS 1,976,315 A * 10/1934 White .................... A01C 7/18
111/44
2,960,258 A    10/1953 Dodwell
(Continued)

FOREIGN PATENT DOCUMENTS

CN        2180028 Y * 10/1994

OTHER PUBLICATIONS

European Search Report for Related Application No. EP15152071, Dated Jun. 18, 2015.
(Continued)

*Primary Examiner* — Christopher J Novosad
(74) *Attorney, Agent, or Firm* — Ingrassia, Fisher & Lorenz PC

(57) ABSTRACT

A alignment system is described for a blocking member for the transfer of seed from a seed meter with a seed meter housing to a delivery system with a delivery system housing. The blocking member may have a blocking face adjacent a seed path of the seed meter, the blocking face opening to a seed passage, and the seed passage extending through the blocking member to an interface with the delivery system housing. A first recess may be included on the blocking member, and a second recess may be included on the delivery system housing. When the seed passage of the blocking member is correctly aligned with the delivery system, a protrusion on the delivery system housing may be configured to seat firmly in the first recess and a protrusion on the seed meter housing may be configured to seat firmly in the second recess.

10 Claims, 28 Drawing Sheets

(56) References Cited

U.S. PATENT DOCUMENTS

| | | | |
|---|---|---|---|
| 2,882,977 A * | 4/1959 | Smith | A01G 3/062 172/120 |
| 5,170,909 A | 12/1992 | Lundie et al. | |
| 6,024,033 A | 2/2000 | Kinkead et al. | |
| 6,581,535 B2 * | 6/2003 | Barry | A01C 7/127 111/181 |
| 6,681,706 B2 | 1/2004 | Sauder et al. | |
| 6,932,236 B2 * | 8/2005 | Ven Huizen | A01C 7/046 111/77 |
| 7,661,377 B2 | 2/2010 | Keaton et al. | |
| 7,918,968 B1 | 4/2011 | Baker et al. | |
| 8,276,529 B2 * | 10/2012 | Garner | A01C 7/042 111/171 |
| 8,522,699 B2 * | 9/2013 | Garner | A01C 7/042 111/171 |
| 8,671,856 B2 * | 3/2014 | Garner | A01C 7/042 111/171 |
| 8,800,457 B2 * | 8/2014 | Garner | A01C 7/042 111/171 |
| 2010/0192818 A1 | 8/2010 | Garner et al. | |
| 2010/0192819 A1 | 8/2010 | Garner et al. | |
| 2012/0067260 A1 | 3/2012 | Garner et al. | |
| 2014/0196642 A1 | 7/2014 | Garner et al. | |

OTHER PUBLICATIONS

USPTO, Office Action for U.S. Appl. No. 14/170,225, mailed Aug. 27, 2015.

* cited by examiner

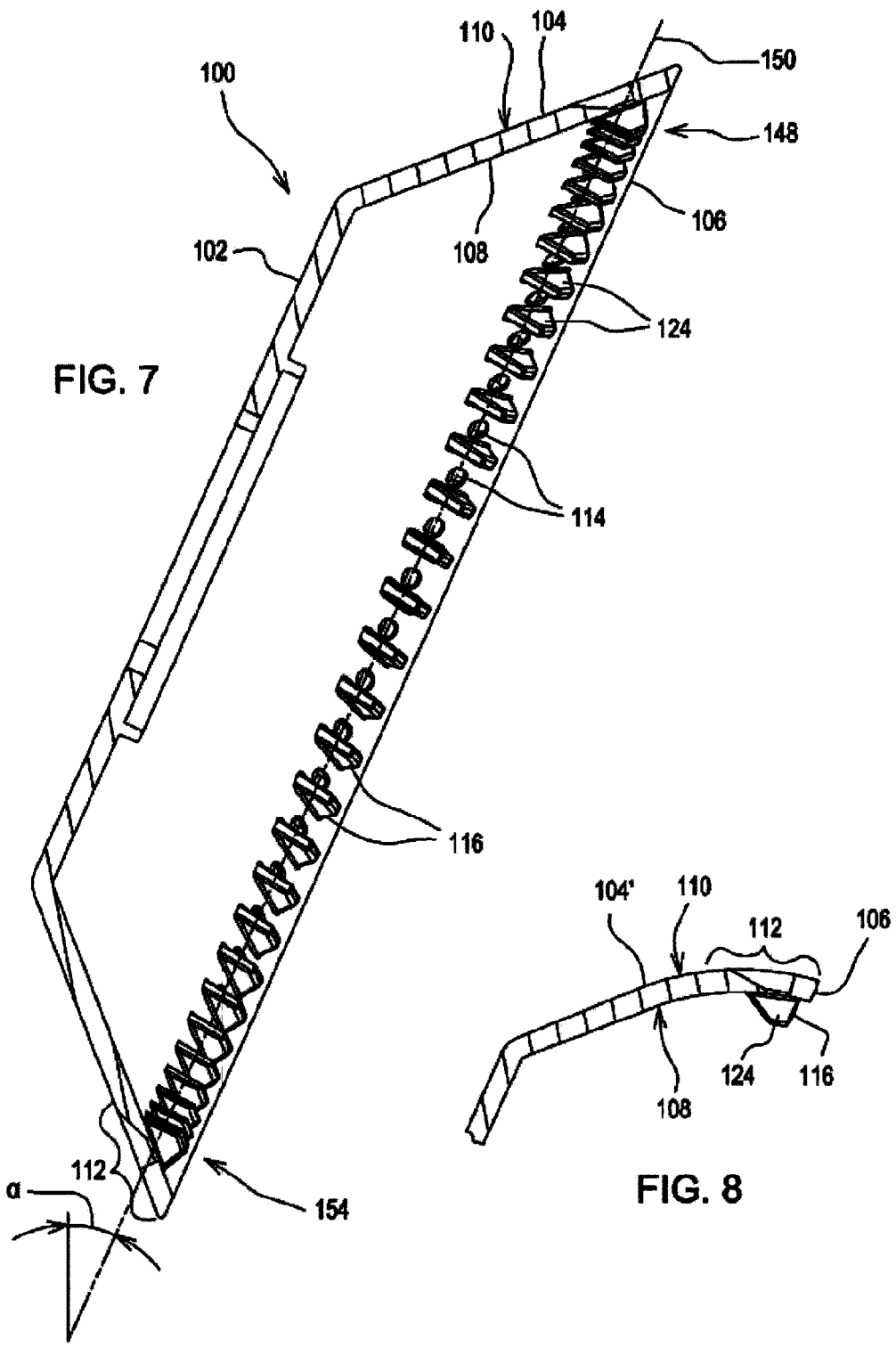

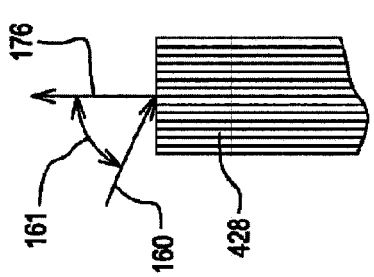
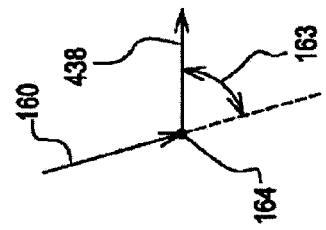
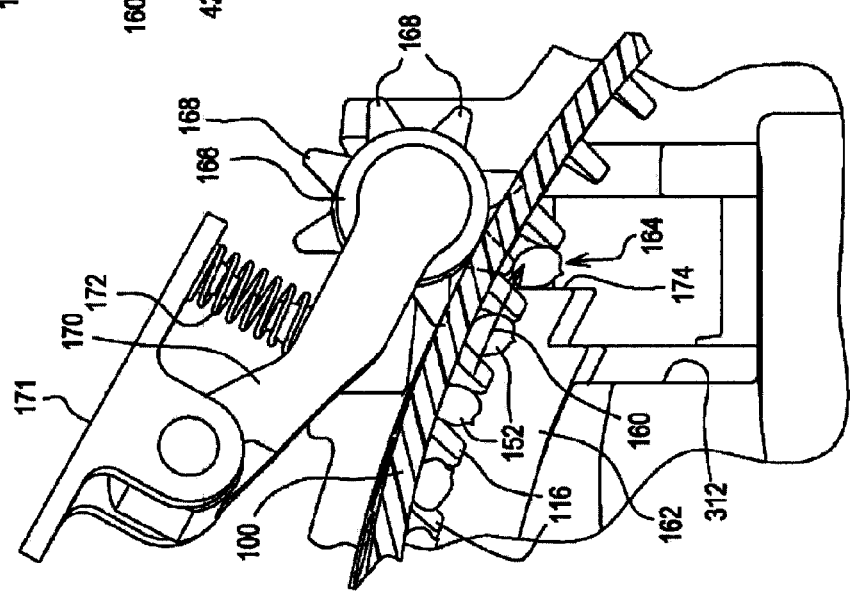
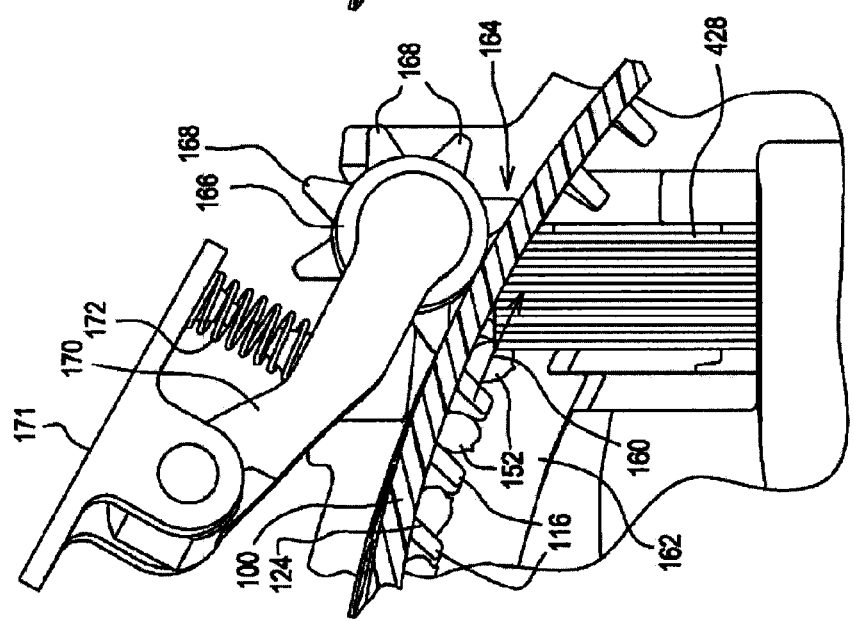

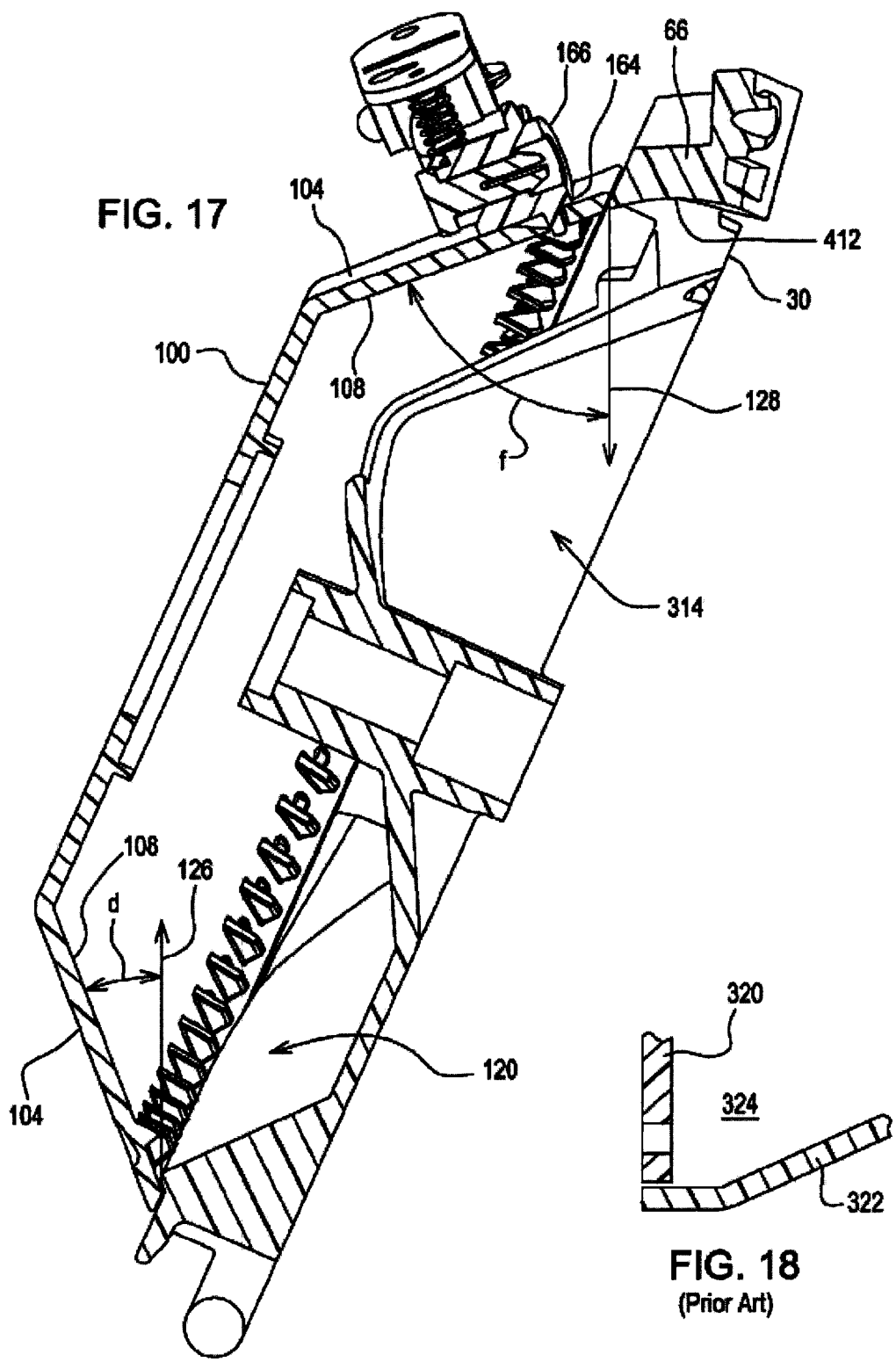

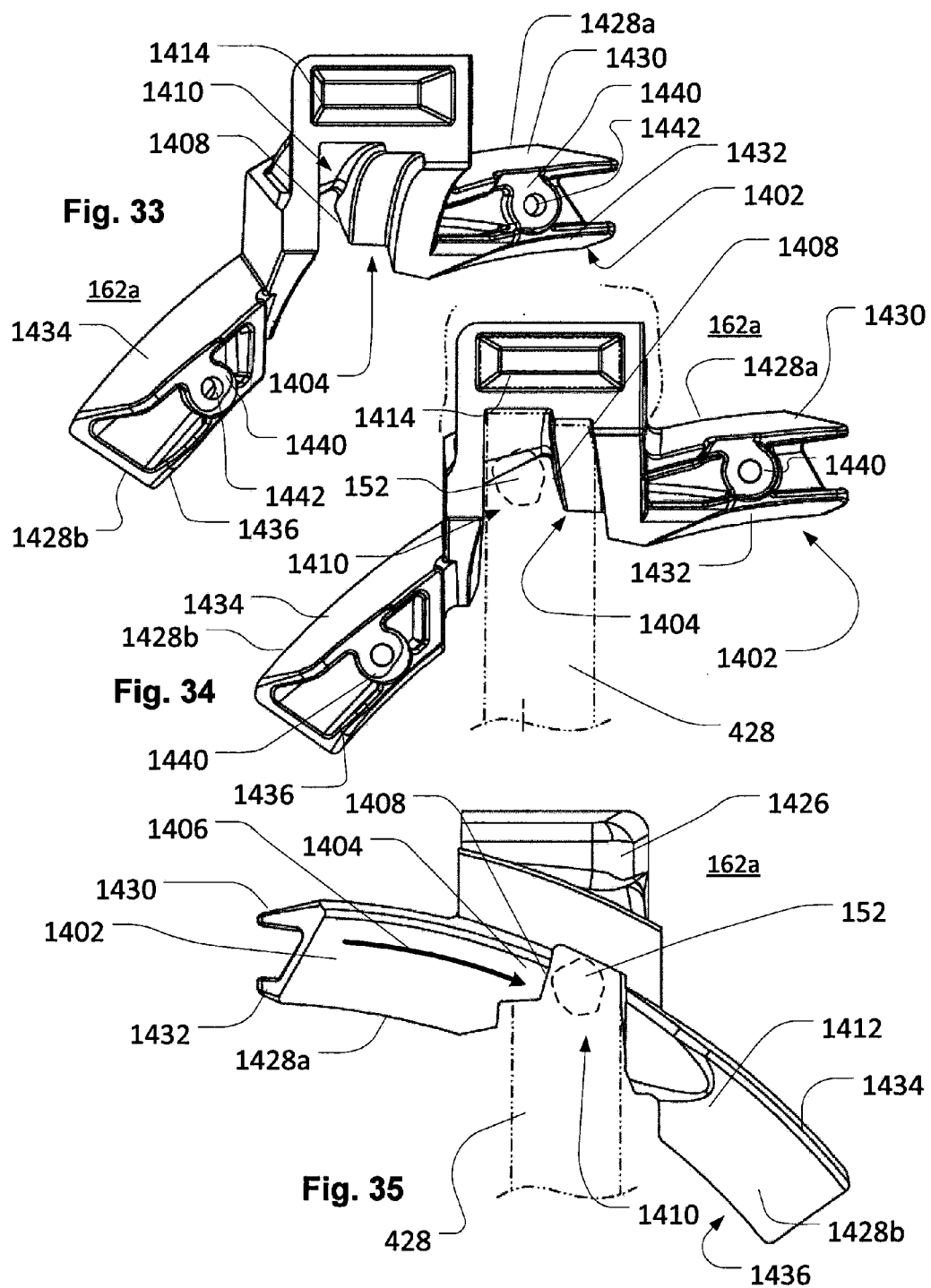

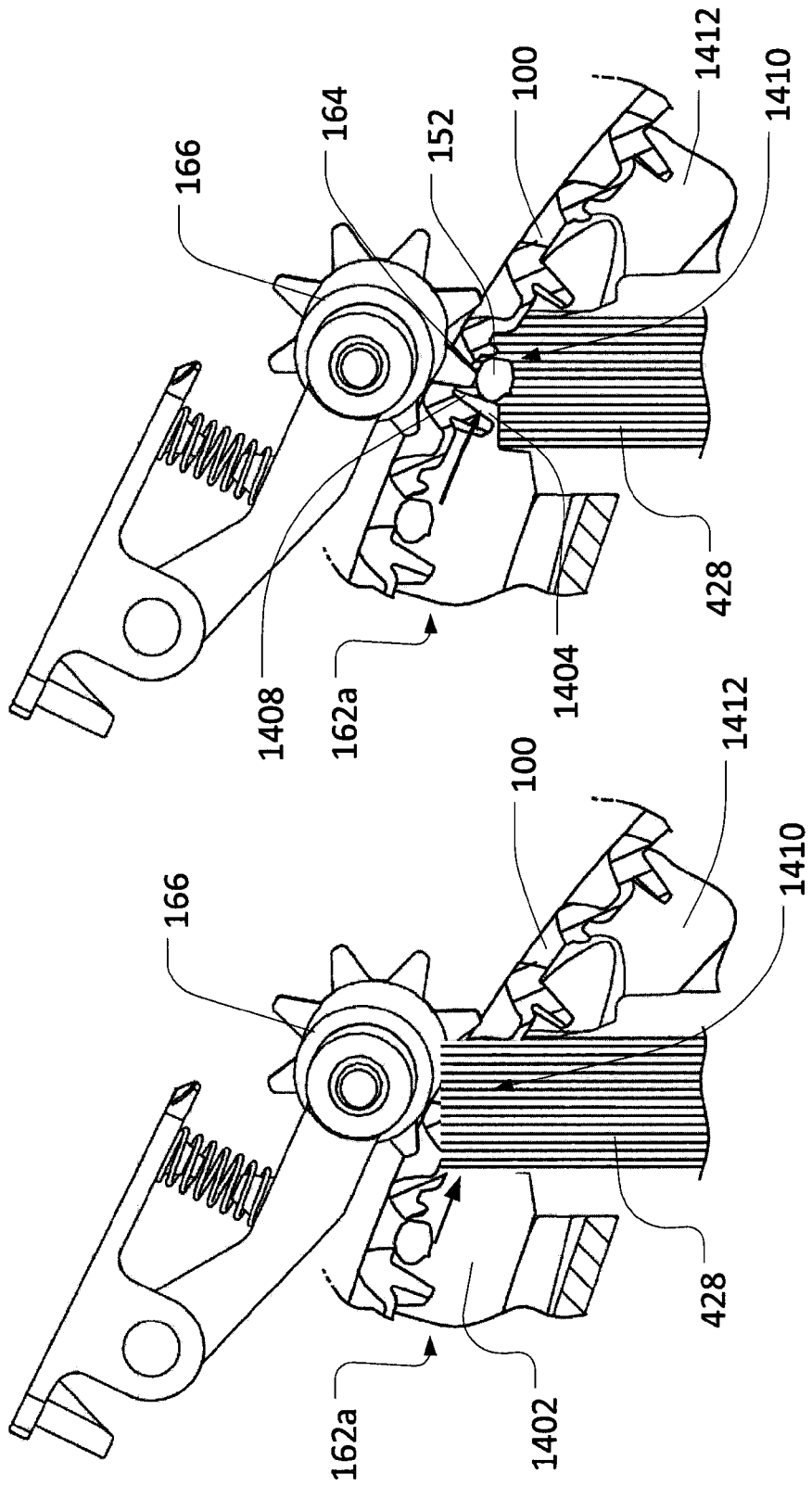

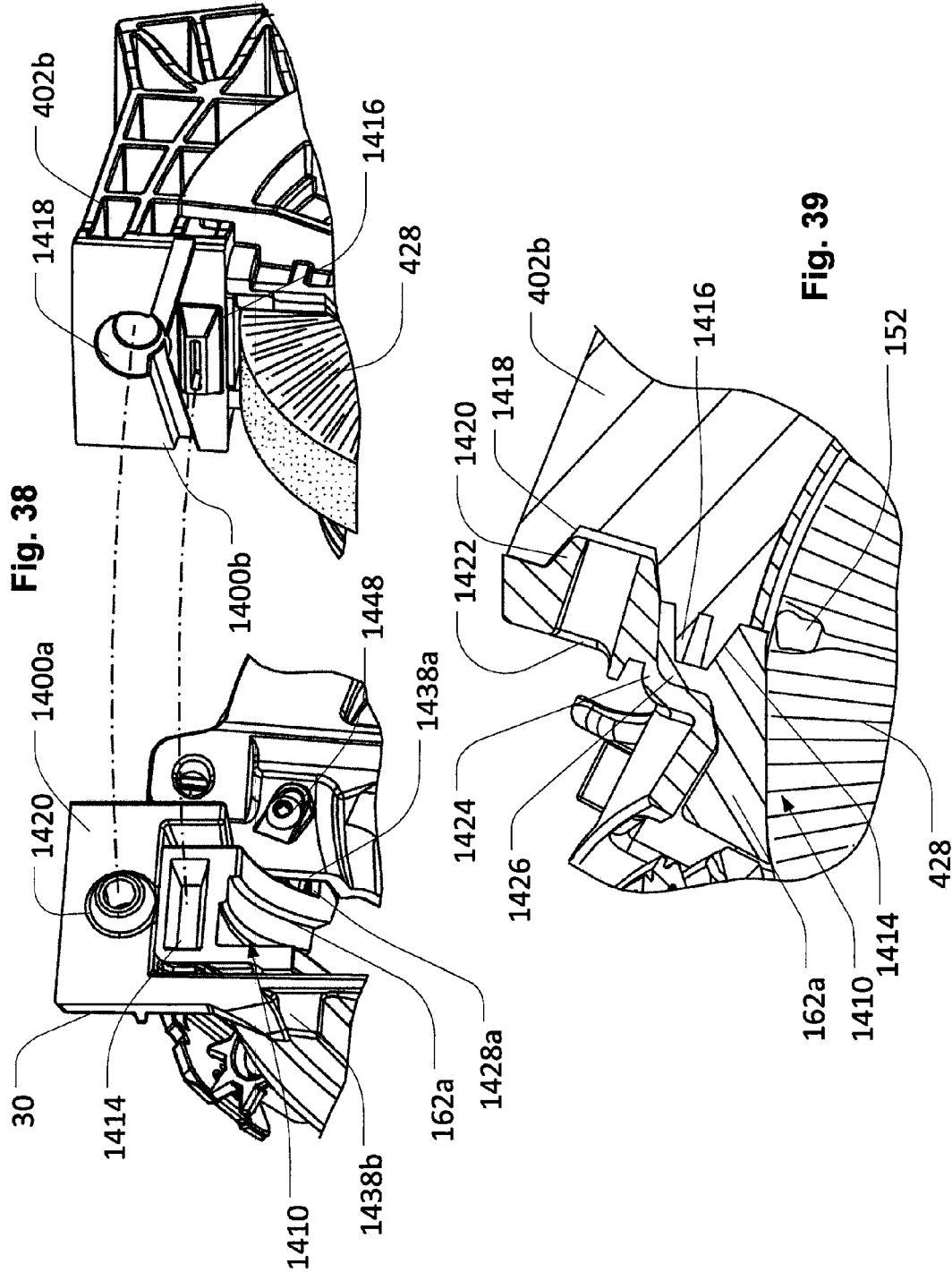

ALIGNMENT SYSTEM FOR A BLOCKING MEMBER OF A PLANTING UNIT

CROSS-REFERENCE TO RELATED APPLICATION(S)

This application is a Continuation-in-part of U.S. patent application Ser. No. 13/072,175, filed Mar. 25, 2011, which is a Continuation-in-part of U.S. patent application Ser. No. 12/363,968, now U.S. Pat. No. 7,918,168.

STATEMENT OF FEDERALLY SPONSORED RESEARCH OR DEVELOPMENT

Not applicable.

FIELD OF THE DISCLOSURE

The following relates to a planting unit for a seeding machine or planter, and more particularly to a planting unit having a seed meter and seed delivery system.

BACKGROUND OF THE DISCLOSURE

Various types of seed meters have been developed that use an air pressure differential, either vacuum or positive pressure, to adhere seed to a metering member. The metering member takes seed from a seed pool and sequentially discharges single seeds. (In some cases, multiple seeds may be discharged at a time.) One common type of seed meter is shown in U.S. Pat. No. 5,170,909. There, a seed disk 48 contained in a housing is used to meter the seed. The seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk, through a seed tube to a furrow formed in the soil below.

Flexible belts have also been used in an air pressure differential seed meter. One example is shown in US patent application 2010/0192818 A1. There, a flexible belt having an array of apertures therein is movable along a path in a housing. A seed pool is formed on one side of the belt. Vacuum applied on the opposite side of the belt along a portion of the belt path adheres seed to the apertures, allowing the belt to move the seed to a release position where the vacuum is cut-off. The seed then falls or is removed from the belt.

When seed falls by gravity from the meter through the seed tube, it can be difficult to maintain accurate and consistent seed spacing at planting speeds greater than about 8 kph (5 mph). To maintain spacing accuracy, a seed delivery system that controls the seed as the seed moves from the seed meter to the soil is desirable. One such delivery system is shown in US patent application 2010/0192819-A1. With such a delivery system, the hand-off of seed from the disk of U.S. Pat. No. 5,170,909 to the delivery system is difficult to achieve In a consistent manner. While the hand-off of seed may be improved with the use of a belt meter, there is still a need for a more consistent and reliable hand-off of seed from the seed meter to the delivery system.

In various planting units, including those with the configuration noted above as well as various others, it may be useful to provide a blocking member to control the hand-off of the seed between various seed transport systems (e.g., from the seed disk or other metering member to the seed delivery system). Because such a blocking member may need to be aligned with various moving parts (e.g., various seed-moving components of the seed disk and seed delivery system), it may be useful to provide a system for appropriately locating the blocking member

SUMMARY OF THE DISCLOSURE

An alignment system for a blocking member of a planting unit is disclosed, for aligning the blocking member with a seed metering system and a seed delivery system, or various other seed transport systems of a planting unit.

A planting unit for a seeding machine is provided having a seed meter with a metering member that moves seed sequentially along a first path to a release position at which the seed is moving in a first direction and a delivery system adapted to take seed from the metering member at the release position and control movement of the seed from the seed meter to a discharge location adjacent a seed furrow formed in soil beneath the seeding machine. The delivery system includes a brush belt with flexible bristles, which bristles, at the release position, move seed in a second direction along a second path.

A blocking member for controlling the hand-off of seed from the seed meter to a seed delivery system may have a blocking face adjacent a seed path of the seed meter, the blocking face opening to a seed passage that extends through the blocking member to an interface with the delivery system housing.

In certain embodiments, the alignment system includes a blocking member recess on the blocking member at the interface with the delivery system housing. A protrusion (or projection) on the delivery system housing may be configured to seat firmly in the blocking member recess when the seed passage of the blocking member is correctly aligned with the delivery system.

The alignment system may also include a delivery system housing recess on the delivery system housing. A protrusion on the seed meter housing may be configured to seat firmly in the delivery system housing recess when the seed passage of the blocking member is correctly aligned with the delivery system. A recess may extend into the protrusion on the seed meter housing from opposite the interface, the recess being configured to receive a latch extending from the delivery system housing in order to secure the delivery system housing to the seed meter housing. Various protrusions and recessed may be configured with trapezoidal, frustoconical, or other geometries.

In certain embodiments, the seed meter housing may include a recessed geometry and the blocking member may include a corresponding mounting geometry above and outside of the seed passage through the blocking member. The mounting geometry may be configured to seat firmly in the recessed geometry when the blocking face of the blocking member is correctly aligned with metering member or when the seed passage is correctly aligned with the seed delivery system.

The blocking member may include one or more side extensions, with the side extensions including tapered geometry extending away from a face of the side extensions along which the seed meter carries seed. The seed meter housing may include one or more corresponding tapered recesses. The tapered geometry of the one or more side extensions may be configured to seat firmly in the tapered recesses when the face of the side extensions is correctly aligned with the metering member or when the seed passage is correctly aligned with the delivery system.

Various other embodiments are contemplated, including with regard to various housing types, within the scope of the discussion herein.

BRIEF DESCRIPTION OF THE DRAWINGS

FIG. 7 is side cross-section of the metering member of FIG. 6 illustrating the orientation of the metering member installed in a seed meter mounted to a planting unit;

FIG. 8 is a fragmentary cross-section of an alternative metering member;

FIG. 11 is a sectional view of the hand-off of seed from the metering member to the delivery system including the delivery system brush belt;

FIG. 12 is a sectional view like FIG. 11 without the delivery system brush belt;

FIG. 13 is a schematic illustration the direction of entry of seed into the brush belt;

FIG. 14 is a schematic illustration of the direction of travel of the seed on the metering member and in the delivery system at the release position of seed from the metering member;

FIG. 17 is a side sectional view of the metering member and meter housing illustrating the seed pool formed by the metering member and housing;

FIG. 18 is side sectional view like FIG. 17 illustrating a prior art seed meter with a disk metering member;

FIG. 33 is a perspective view of the blocking member shown in FIG. 32;

FIG. 34 is a side view of the blocking member or guide of FIG. 33;

FIG. 35 is an opposite side view of the blocking member or guide of FIG. 33;

FIGS. 36A and 36B are sectional views of a hand-off of seed from the metering member to the delivery system, including a delivery system brush belt, and the blocking member of FIG. 33;

FIG. 38 is an exploded view of an interface between the seed meter and seed delivery system of the planting unit of FIG. 2, with the blocking member mounted to the seed meter housing; and FIG. 39 is a sectional view of an interface between the seed meter and seed delivery system of the planting unit of FIG. 2, taken along plane A-A of FIG. 37.

Like reference symbols in the various drawings indicate like elements.

DETAILED DESCRIPTION

Figure 1:
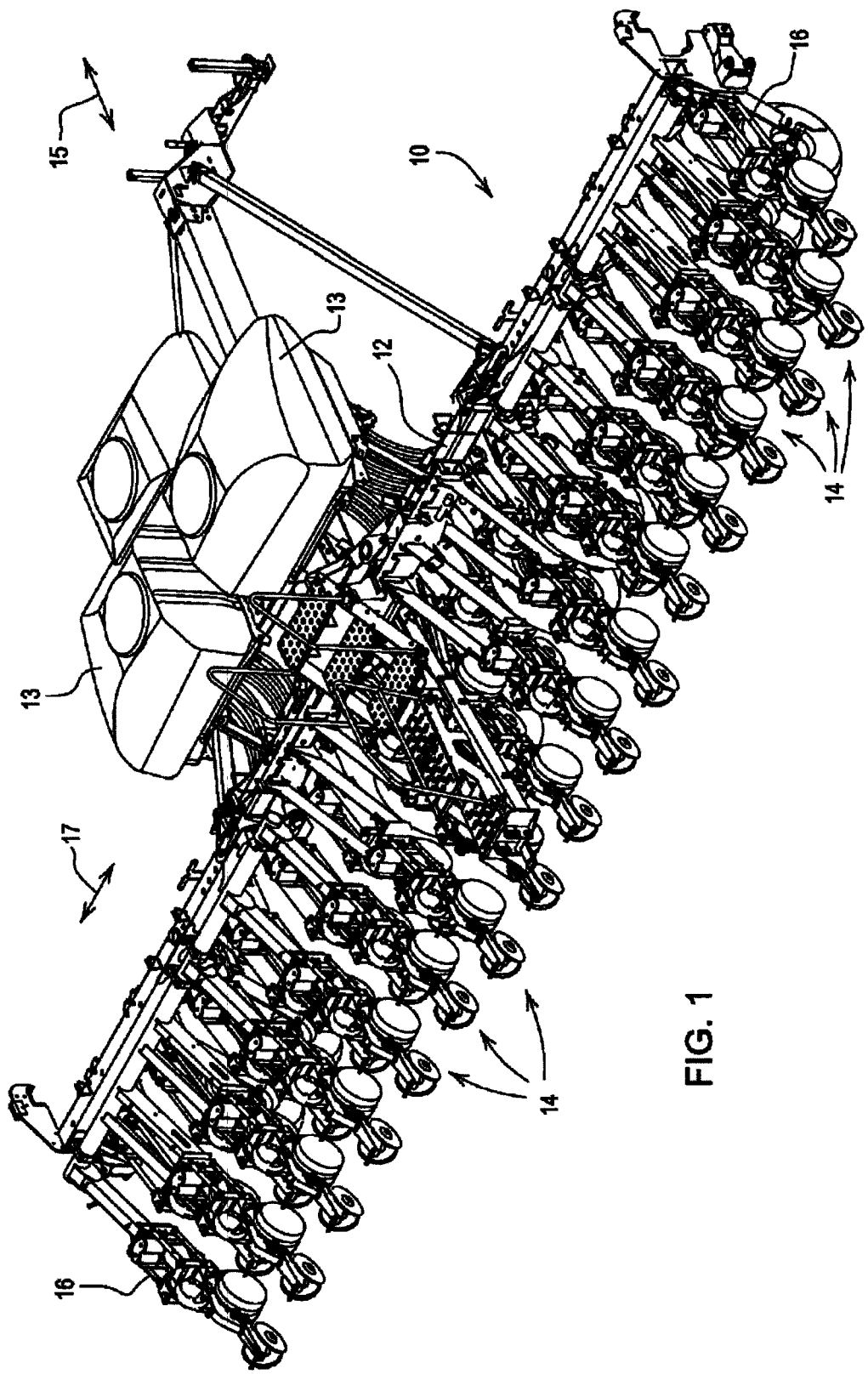
FIG. 1 is a perspective view of a common agricultural planter.

An agricultural seeding machine 10 is shown in FIG. 1 as a row crop planter. Seeding machine 10 has a central frame 12 on which are mounted a plurality of individual planting units 14. The seeding machine 10 has a fore-aft direction shown by the arrow 15 and a transverse direction shown by the arrow 17. Each planting unit 14 is coupled to the central frame 12 by a parallel linkage 16 so that the individual planting units 14 may move up and down to a limited degree relative to the frame 12. Large storage tanks 13 hold seed that is delivered pneumatically to a mini-hopper on each planting unit. Each planting unit 14 has a frame member 18 (FIG. 2) to which the components of the planting unit are mounted. The frame member 18 includes a pair of upstanding arms 20 at the forward end of thereof. The arms 20 are coupled to the rearward ends of the parallel linkage 16. Furrow opening disks (not shown) are attached to shaft 22 in a known manner to form an open furrow in the soil beneath the seeding machine into which seed is deposited. Closing and packing wheels (not shown) are also mounted to the frame member 18 in a known manner to close the furrow over the deposited seed and to firm the soil in the closed furrow. A seed meter 24 and a seed delivery system 400 are also attached to the frame member 18 of the planting unit.

The meter 24 includes a housing 30 (FIG. 3) and a cover 34. The housing 30 and the cover 34 are coupled to one another by complementary hinge features 36 and 38 (see FIG. 5) on the housing and cover respectively. Hinge feature 36 includes a pivot pin 37 coupled to the housing while the feature 38 is an integrally formed hook that wraps around the pivot pin allowing the cover 34 to pivot about the axis of the pin 37. An elastomeric latch member 40 is coupled to the housing 30 and has an enlarged portion 42 that is seated into a socket 44 formed in the cover to hold the cover in a closed position on the housing 30.

Figure 2:
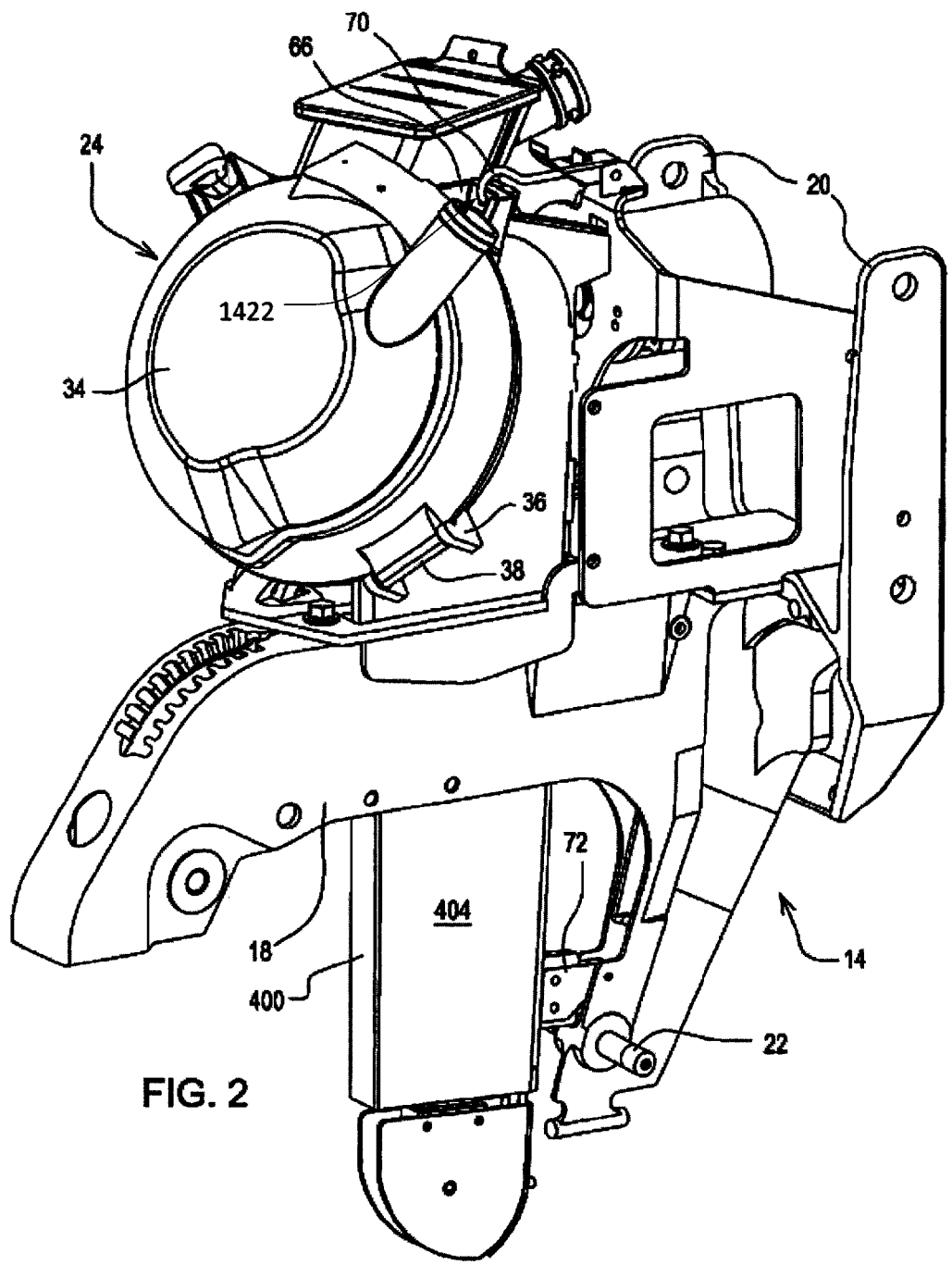
FIG. 2 is a side perspective view of a planting unit frame, seed meter and seed delivery system.
Figure 3:
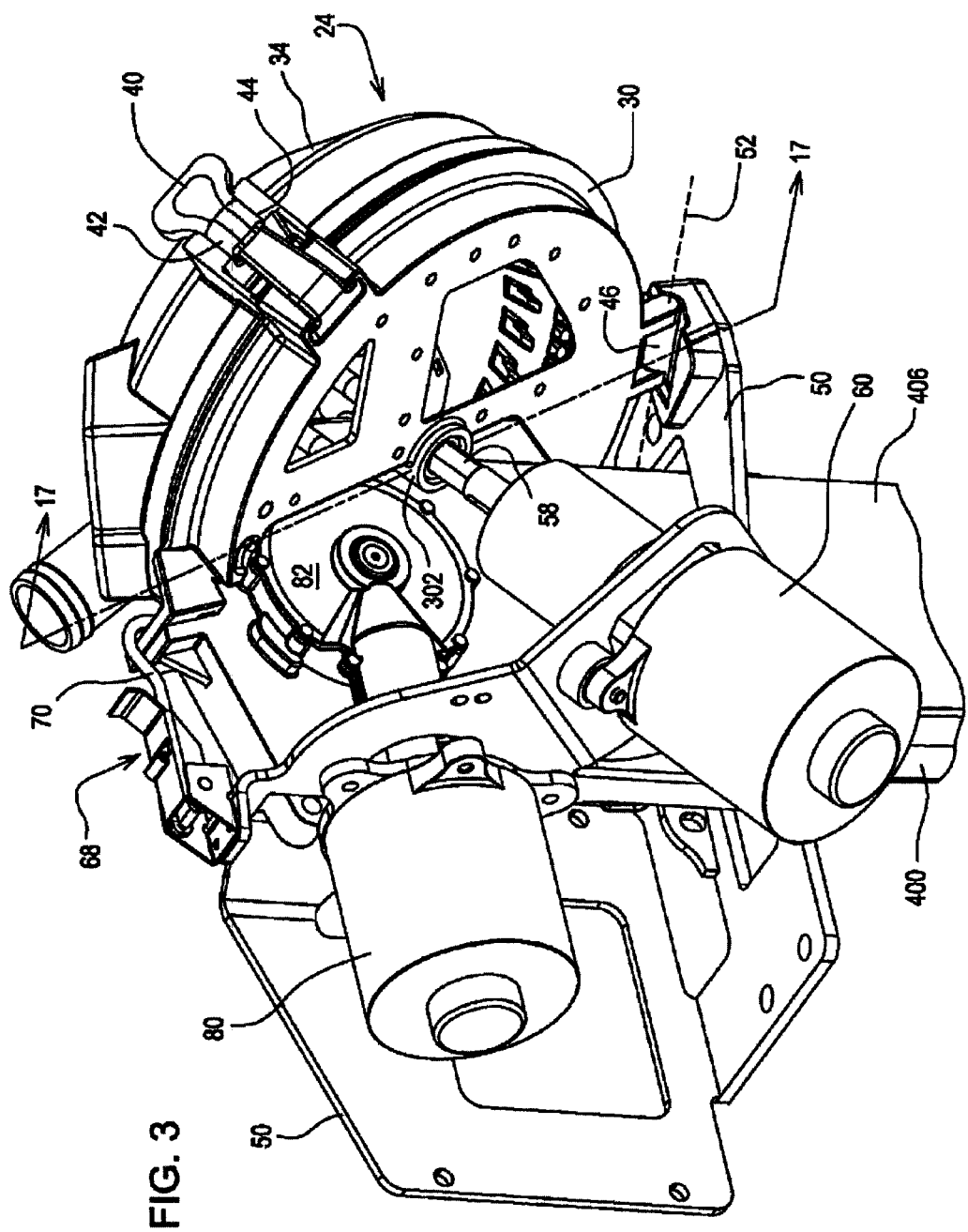
FIG. 3 is an enlarged perspective view of the seed meter and delivery system drives.
Figure 4:
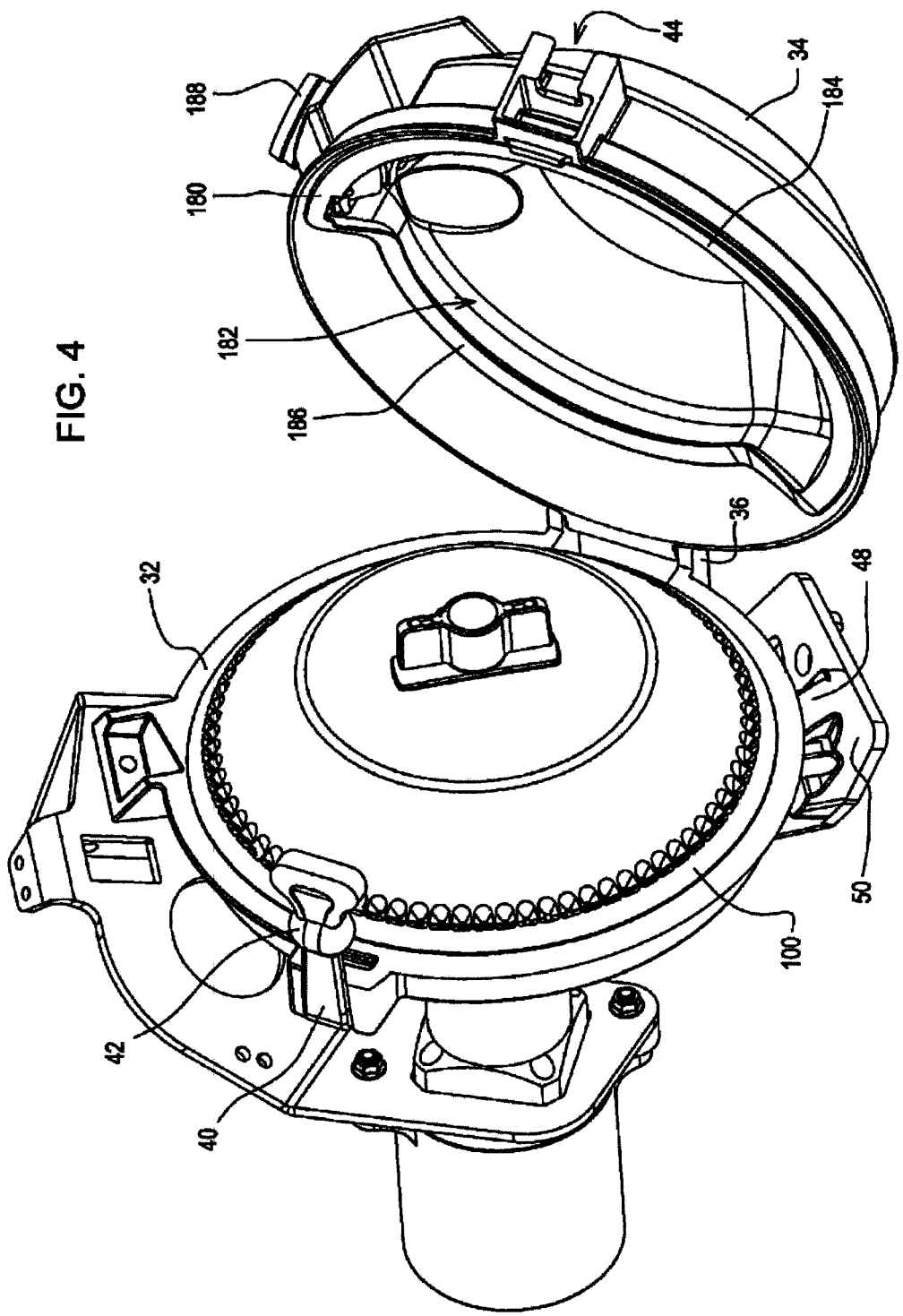
FIG. 4 is a perspective view of the seed meter with the cover open illustrating the metering member.

The housing 30 is formed with a second hinge element in the form of a pivot pin 46 (FIG. 3). Pivot pin 46 is seated into a hook member 48 (FIG. 4) of the mounting frame 50 attached to the frame member 18. This allows the seed meter 24 to pivot relative to the planting unit frame member 18 about an axis 52. A drive spindle 54 is carried by the housing 30 and has a drive hub 56 (FIG. 5) on the end thereof. The spindle 54 couples to the output shaft 58 of electric motor 60 to drive the seed meter when in the assembled position shown in FIG. 3. The seed meter 24 is coupled to the delivery system by a latch mechanism 68 including a metal rod 70 having a hook at one end seated into an aperture in the meter housing 30 when latched. The delivery system further has a mounting hook 72, partially shown in FIG. 2, which attaches to the planting unit frame member 18 to support the delivery system.

The delivery system 400 is driven by an electric motor 80, also carried by the mounting frame 50. The output shaft of motor 80 is connected to the delivery system through a right-angle drive 82. While electric motors have been shown to drive both the seed meter and the seed delivery system, it will be appreciated by those skilled in the art that other types of motors, such as hydraulic, pneumatic, etc. can be used as well as various types of mechanical drive systems.

Figure 6:
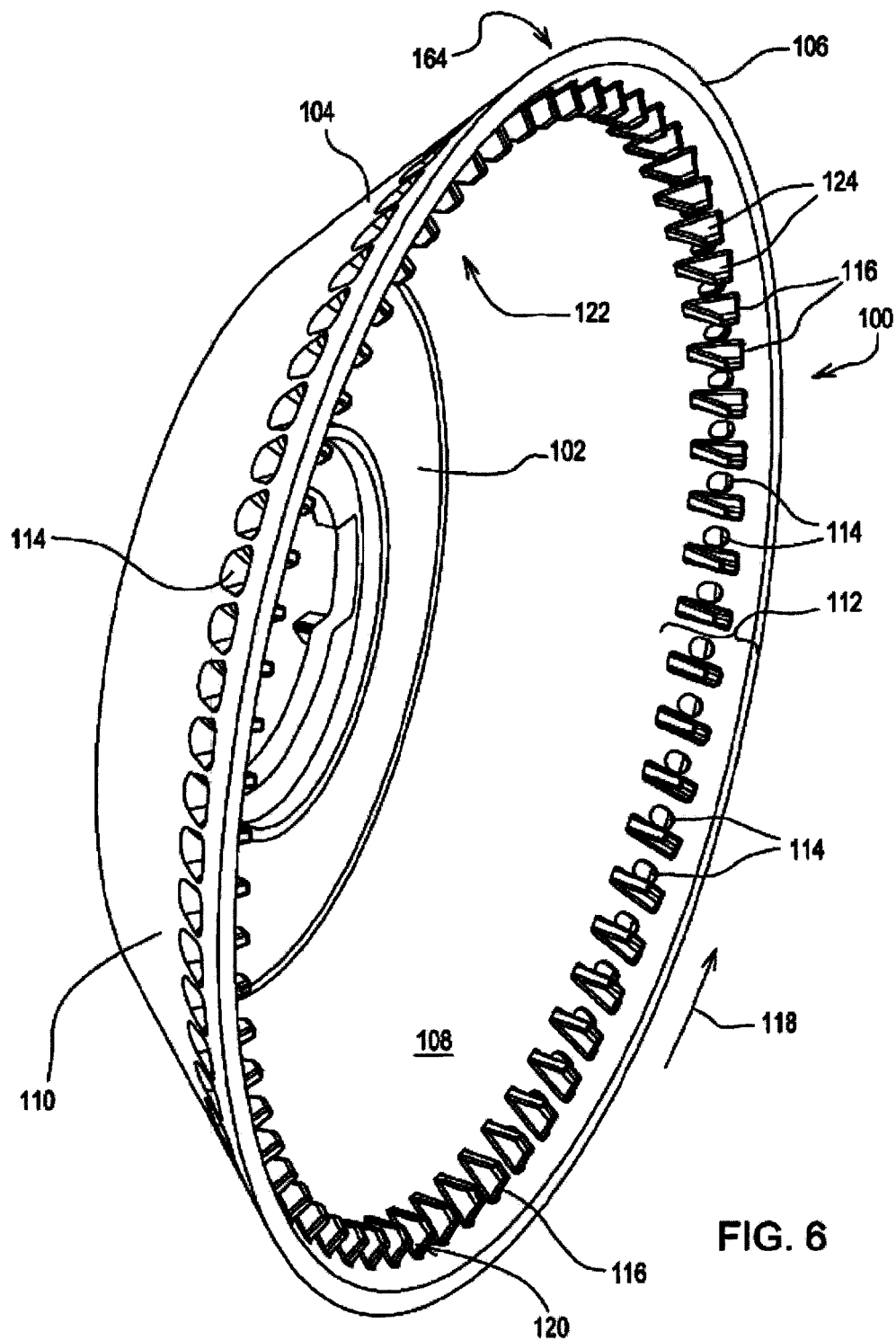
FIG. 6 is a perspective view of the metering member of FIG. 4.

With reference to FIG. 6, a metering member 100 of the seed meter is shown in greater detail. Metering member 100 is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 6. The rim portion 112 extends radially outwardly and axially toward the outer edge 106. In the rim portion 112, there is an annular array of apertures 114 that extend through the sidewall between the inner and outer surfaces 108 and 110. The metering member 100 is mounted in the meter housing for rotation in the direction of the arrow 118 in FIG. 6. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member. Thus, the inner surface is also known as the seed side of the metering member. A series of raised features or projections, such as paddles 116, extend from the inner surface 108 of the sidewall 104 typically with one paddle located behind each aperture 114 in the direction of rotation. Each paddle forms a confronting surface 124 behind the associated aperture in the direction of rotation to push the seed adhered to the aperture into the delivery system as described below. As explained above, it is the rim portion 112 of the metering member that performs the function of drawing individual seeds from the seed pool and sequentially moving seed to the release position to supply seed individually to the seed delivery system 400.

The base portion 102 of the metering member contains a central drive aperture 130 (FIG. 5) used to mount the metering member on a rotational drive hub 56 for rotation about the axis 132 in a manner similar to mounting a flat seed disk in a seed meter as is well known. When mounted to the housing 30, the metering member 100 cooperates with the housing to form a trough to hold the seed pool 120 as described more fully below. The axis 132 is inclined to both a horizontal plane as well as to a vertical plane extending fore and aft of the seeding machine and a vertically plane extending transversely to the seeding machine.

With reference to FIG. 7, the metering member 100 is shown in a sectional view. The base portion 102 is a generally planar while the rim portion 112 of the inner surface of the sidewall 104 is outwardly flared, that is, extending both radially outward and axially. As shown in FIG. 7, the rim portion is frusto-conical. Alternatively, as shown in FIG. 8 in connection with a metering member sidewall 104', the inner surface of the sidewall rim portion 112 may be frusto-spherical in shape. Furthermore, while the rim portion 112 has been shown as being outwardly flared, the rim portion could be generally cylindrical without any outward flair, that is, extending only axially.

The metering member 100 can be formed as one piece or constructed of multiple pieces. The metering member can be most easily molded of plastic such as polycarbonate, nylon, polypropylene or urethane. However, other plastics can be used as well as other materials such as metal, etc. The metering member 100 is sufficiently rigid to be self-sustaining in shape without additional supporting structure. This is in contrast to the flexible belt metering member shown in U.S. Pat. No. 2,960,258 where it be belt member is preferably of a flexible elastomeric material and is supported within a support ring. Being self-sustaining in shape, the metering member does not need any supporting structure to hold a shape. As a self-sustaining, the metering member may be rigid or the metering member may be flexible to change shape when acted upon in a manner similar to the flexible seed disk of U.S. Pat. No. 7,661,377.

As previously mentioned, the metering member 100 can be mounted to a drive hub through the central drive aperture 130 in the base portion 102. Mounting through the central drive aperture 130 provides both mounting support of the metering member as well as the rotational drive of the metering member. Alternatively, support for the metering member can be provided on the outer surface of the sidewall. A groove may be formed in the outer surface of the sidewall to receive rollers that support the metering member. If the groove is also formed with drive teeth, one of the rollers could be driven by a motor to rotate the metering member. With such alternative arrangements possible, it is not necessary that the metering member have a base portion. The function of metering seed is performed by the sidewall and thus, the sidewall is the only required portion of the metering member.

As shown in FIG. 7, the metering member 100, when mounted in the meter housing, is oriented at an incline to the vertical as shown. In this orientation, the apertures 114 lie in a plane 150 inclined at an angle α relative to vertical. In this orientation, an upper portion 148 of the metering member overhangs or extends beyond a lower portion 154. As described below, this allows access to the upper portion 148 of the metering member for the mechanical seed delivery system 400. As shown, the angle α is approximately 24°. However, any angle will suffice as long as the upper portion 148 extends beyond the lower portion sufficiently for access for the seed delivery system from below the metering member at the seed release position.

Figure 9:
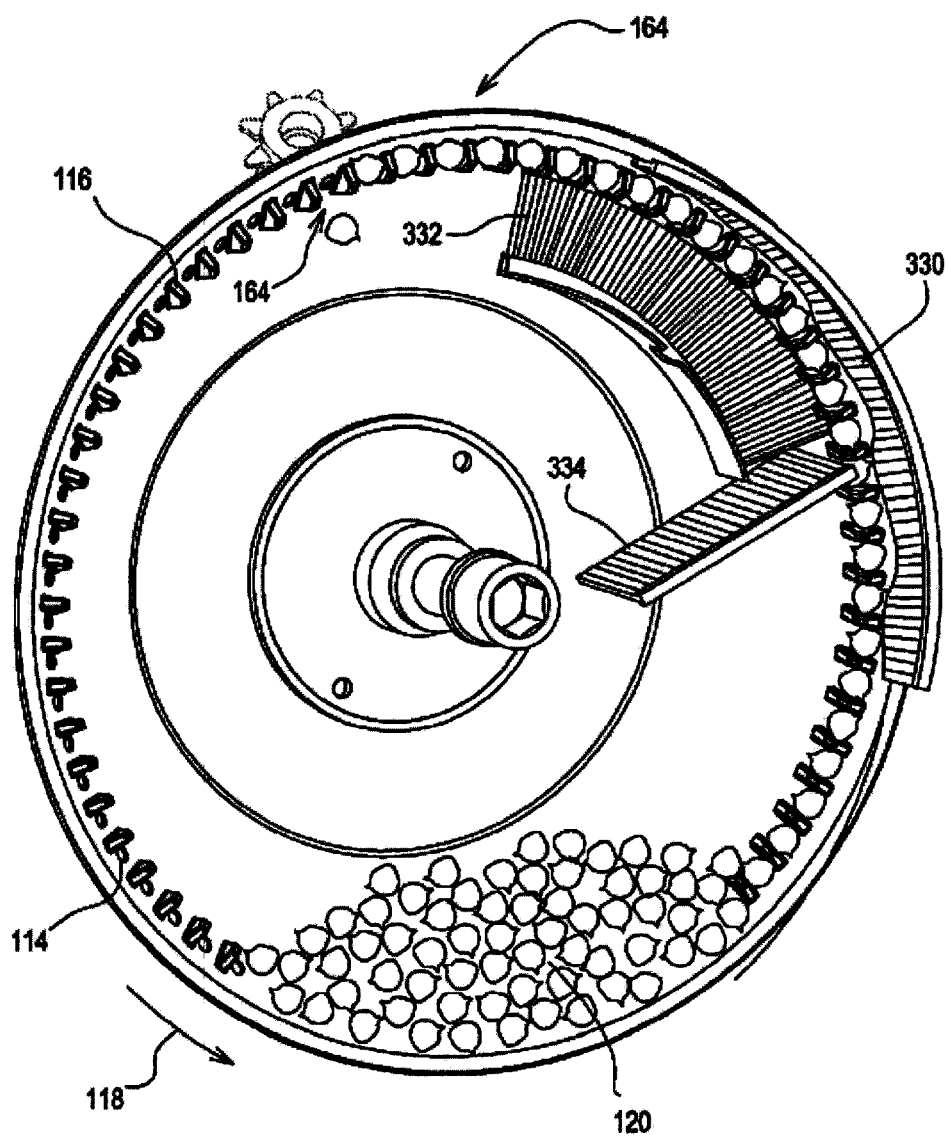
FIG. 9 is an elevational view of one embodiment of the inside of the metering member of FIG. 6.

The seed pool 120 is formed at the bottom of the metering member 100 as shown in FIG. 9. Vacuum is applied to the outer surface 110, causing individual seeds to be adhered to the apertures 114 as the apertures travel through the seed pool. As the metering member rotates as shown by the arrow 118, seed is moved upward to a release position 164 at the upper portion 148 of the metering member. The release position is slightly past the top or 12 O'clock position on the circular path of travel of the seed such that the seed is moving somewhat downward at the release position. This facilitates the seed's entry into the delivery system as more fully described below. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or is hanging from the metering member. See FIG. 10. The seed delivery system 400 is also positioned beneath the upper portion of the metering member at the release position 164 to take the seed from the metering member as shown in FIG. 10.

Delivery system 400 includes a housing 402 having a left sidewall 404 (see FIG. 19) and a right sidewall 406 (see FIG. 3). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. (It will be understood that other configurations may also be possible. For example, delivery system 400 may be oriented horizontally, rather than vertically, or at various deviations from horizontal or vertical. As such, in a general sense, opening 416 may be viewed as an inlet opening to delivery system 400, and opening 418 may be viewed as an exit opening.) A pair of pulleys 420 and 422 are mounted inside the housing 402. The pulleys a support a belt 424 for rotation within the housing. One of the two pulleys is a drive pulley while the other pulley is an idler pulley. The belt has a flexible base member 426 to engage the pulleys. Elongated bristles 428 extend from the base member 426. The bristles are joined to the base member at proximal, or radially inner, ends of the bristles. Distal, or radially outer, ends 430 of the bristles touch or are close to touching the inner surface of the housing edge wall 410.

Figure 10:
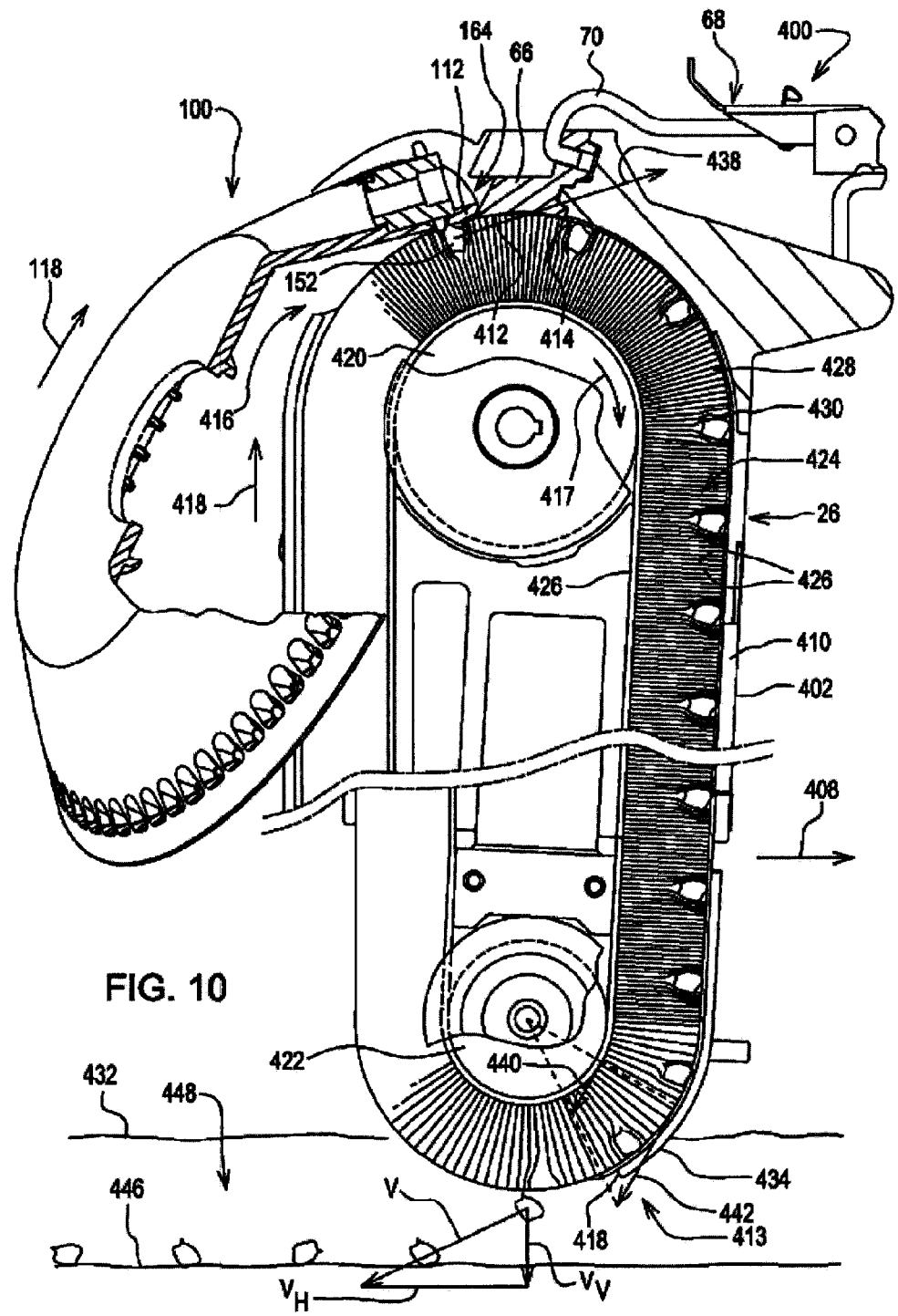
FIG. 10 is a side sectional view of one embodiment of the metering member and seed delivery system.

As shown at the top of FIG. 10, a seed 152 is at the release position on the metering member 100 and has just been inserted into the bristles 428 of the delivery system. At the release position, the rim portion 112 of the metering member sidewall 104 is generally tangent to the stationary inner surface 412 across which the brush bristles 428 sweep. The surface 412 is on a latch portion 66 of the housing 30. The surface 412 is a continuation of the inner surface 414 of the delivery system housing 402. Once the seed is captured in the delivery system, the seed moves in the direction of the belt, shown by the arrow 417. The direction of travel of the seed immediately upon capture by the delivery system 400 is shown by the vector 438.

Prior to release of the seed from the metering member, the seed is moving in the direction of vector 160 which is slightly downward into the bristles 428. With reference to FIG. 13, the vector 160 of the seed direction is at an angle 161 of about 60° to the length of the bristles 428 shown by the arrow 176. As shown in FIG. 11, the brush belt is positioned so that seed enters the bristles at the corner of the brush belt. The brush can be positioned so that the seed enters the brush through the distal ends of the bristles or through the side of the bristles.

The relationship between the seed direction vector 160 on the metering member and the seed direction vector 438 when the seed is first in the brush belt is shown in FIG. 14 illustrating the two vectors in the plane containing both vectors at the release position 164. The angle 163 between the vectors is at least 35° and preferably between 50° and 80°. This shows the cross-feed of the seed into the bristles, meaning that the seed, prior to the release position is moving substantially in a different direction than the brush bristles are moving. This is in contrast to the arrangement shown in FIG. 3 of the previously mentioned US patent application 2010/0192819-A1 where the seed on the metering disk at the release is moving in substantially the same direction as the brush bristles. This is also the relationship by which the bristles sweep over the inner surface of the sidewall relative to the travel direction of seed.

Figure 15:
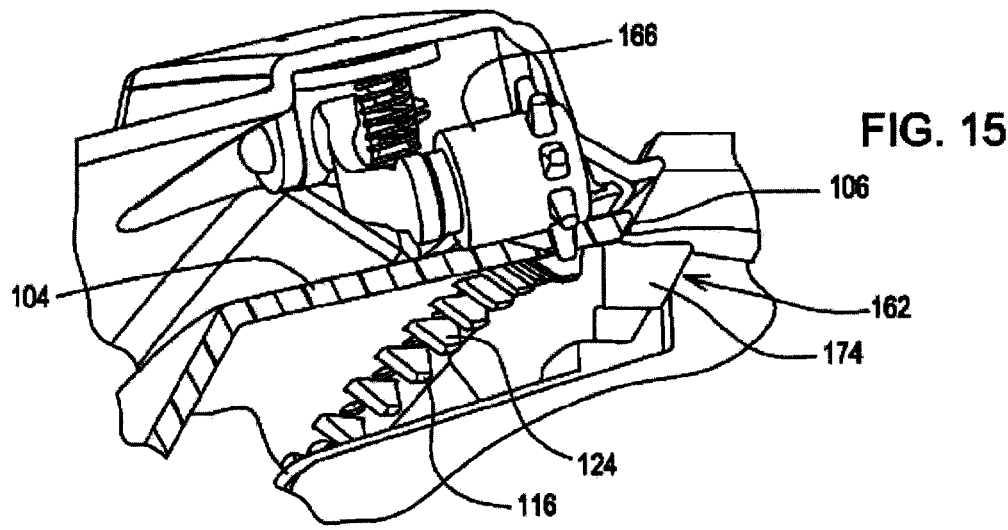
FIG. 15 is side sectional view of the metering member and delivery system at the hand-off without the brush belt.

FIGS. 11 and 12 show a blocking member 162 carried by the meter housing 30. Blocking member 162 is positioned adjacent a path of travel of seed 152 leading to the release position 164 and prevents movement of seed from the metering member prior to reaching the release position. Once the seed has passed the end 174 of the blocking member 162, the seed is free to move with the brush bristles in the direction of the vector 438 in FIG. 10. The blocking member ensures that the seed is consistently feed into the brush belt in the center of the belt, widthwise, rather than allowing the seed to enter the belt at random positions across the belt width. As shown in FIG. 15, the blocking member is located beneath the sidewall 104 of the metering member 100 between the paddles 116 and the outer edge 106 of the metering member. The confronting surfaces 124 of the paddles 116 push seed into the brush bristles. The paddles or projections 116 travel further into the brush bristles, that is deeper into the bristles from their distal ends, as the projections cross the width of the brush as seen in FIG. 11. Once seed is in the brush bristles, the seed is swept over the inner surface of the metering member, from the apertures 114 to the outer edge 106 of the metering member in the direction of the vector 438. The delivery system could be arranged to sweep seed in the opposite direction, that is, away from the outer edge 106 of the metering member.

To further ensure consistent release of seed from the metering member and hand-off to the delivery system, an ejector 166, carried by the cover 34 rides on the outer surface of the metering member rim portion. See FIGS. 11, 12 and 15. The ejector 166 is in the form of a star wheel having a number of projections 168. The projections 168 extend into the apertures 114 from the outer surface 110 of the sidewall 104 and force seed out of the apertures 114. The ejector is caused to rotate by rotation of the metering member 100 due to the projections 168 engaging in the apertures 114. The ejector is mounted to the cover 34 via a pivot arm 170 and bracket 171. The ejector 166 is biased against the metering member by a spring 172.

Turning attention once again to FIG. 4, a flexible seal 180 is shown on the inner side of the cover 34. This seal bears against the outer surface 110 of the metering member 100 forming a vacuum chamber within the interior 182 of the seal. A first portion 184 of the seal is spaced radially further out on the metering member than is the second portion 186 of the seal. In the area of the seal first portion 184, vacuum is applied to the apertures 114, causing seed to adhered thereto. There is no vacuum applied to the apertures adjacent and outside of the seal second portion 186. A port 188 in the cover 34 is adapted to connect the interior of the cover to a vacuum source in a known manner for a vacuum seed meter. The seed release position 164 is within the vacuum chamber. Thus, the brush belt and the ejector are working in opposition to the vacuum applied to the apertures 114 to release the seed from the metering member.

Figure 16:
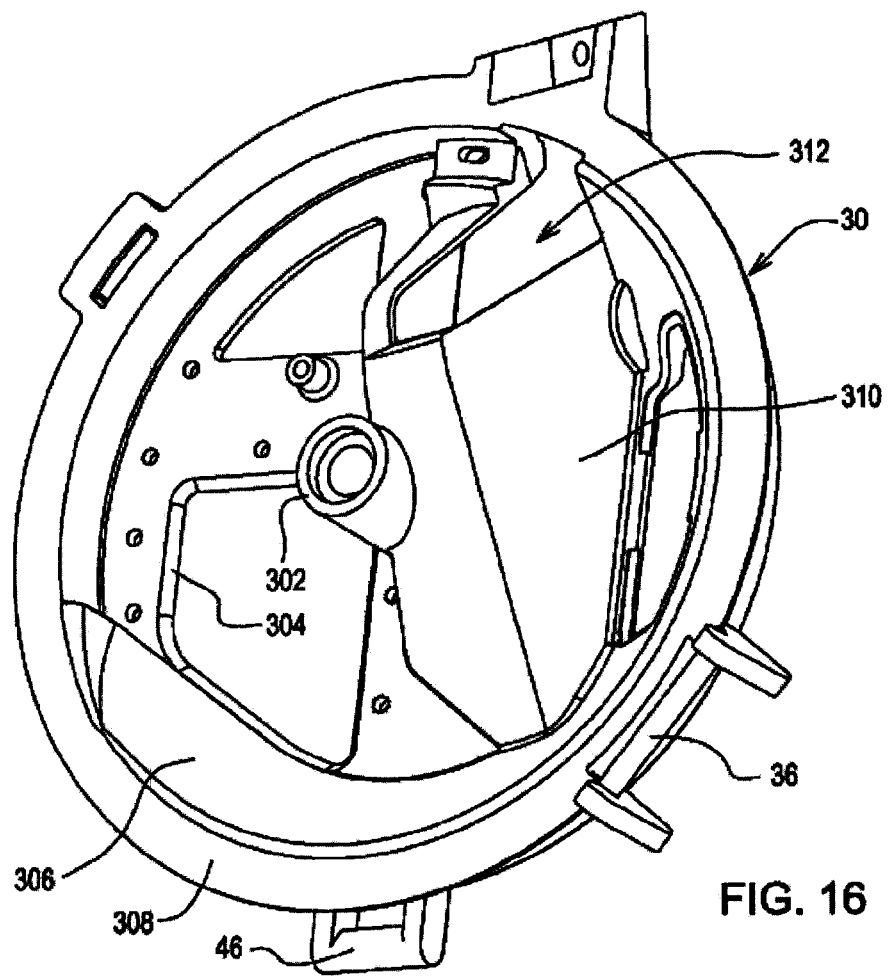
FIG. 16 is a perspective view of the inner side of the seed meter housing.

With reference to FIG. 16, The inside of the housing 30 is shown. The housing includes a central boss 302 for the drive spindle 54. The housing also includes an opening 304 to receive seed from a mini-hopper, not shown, mounted to the outside of the housing and surrounding the opening 304. Below the opening 304, the housing wall forms a ramp 306 extending downward toward the lower end 308 of the housing. The ramp cooperates with the inner surface 108 of the metering member to hold the seed pool 120. The housing includes an inward projection 310 forming a cavity 314 (FIG. 17) on the outside of the housing into which the upper end if the delivery system 400 is placed. The projection is open at the upper end, forming a downward looking opening 312 from the interior of the housing to the exterior. This opening 312 allows the brush belt 424 to access the inner surface of the 108 of the metering member and carry seed from the housing.

FIG. 17 illustrates the orientation of the metering member and the cooperation of the housing 30 and metering member 100 to form a trough for the seed pool 120 at the lower end of the metering member. FIG. 17 shows the orientation of the metering member when the seeding machine 10 is on level ground. At the lower end of the metering member, the sidewall 104 is inclined to the vertical such that the inner surface 108 is at an angle d to the vertical vector 126. As illustrated in FIG. 17, the inner surface is approximately 21° from vertical. The orientation of the housing adjacent the metering member, forming the other side of the trough, is not critical. Seed from the seed pool 120 sits on top of the inner surface 108 and a component of the force of gravity is perpendicular to the inner surface 108. When operating on a hillside, if the meter is tilted clockwise or counter-clockwise, as viewed in FIG. 17, the inner surface 108 remains inclined and gravity still has a component perpendicular to the inner surface. This is in contrast to a typical disk seed meter shown in FIG. 18 with a vertically oriented disk 320 cooperating with a housing wall 322 for form a seed pool 324. If this meter is tilted counter-clockwise as viewed, seed from the pool will still bear against the disk. However, if the meter is tilted clockwise, seed from the pool will fall away from the disk, allowing for decreased metering performance in terms of seed being picked-up by the disk. Evaluation of the meter has shown improved meter performance on a hillside when the angle d is as small as 5° and as large as 75°. Better performance is achieved when the angle d is between 10° and 50° while the optimum performance is in the range of 20° to 40°. This last range provides considerable tilting of the seed meter on a hillside in any direction before performance begins to decrease.

At the upper end of the metering member, at the release position 164, the inner surface 108 has an angle f to a downward vertical vector 128 in the range of 50° to 90° with the closer to 90° being the better for hand-off of seed from the metering member to the brush belt. As shown, the angle f is approximately 68°. The different orientations of the inner surface 108 relative to vertical at the seed trough and at the release position is accomplished with a metering member that is rigid. Such variation is not possible with the flat disk metering member shown in FIG. 18.

As described above, seed is adhered to the apertures 114 in the metering member due to the vacuum applied to the outer surface of the metering member creating a pressure differential on opposite sides of the metering member. As an alternative to vacuum on the outer side of the metering member, the pressure differential can be created by a positive pressure between the housing 30 and the metering member 100. Such a system would require seals between the metering member 100 and the housing 30 to create a positive pressure chamber. In a positive pressure arrangement, the cover 34 only serves as a cover for the rotating metering member.

Figure 5:
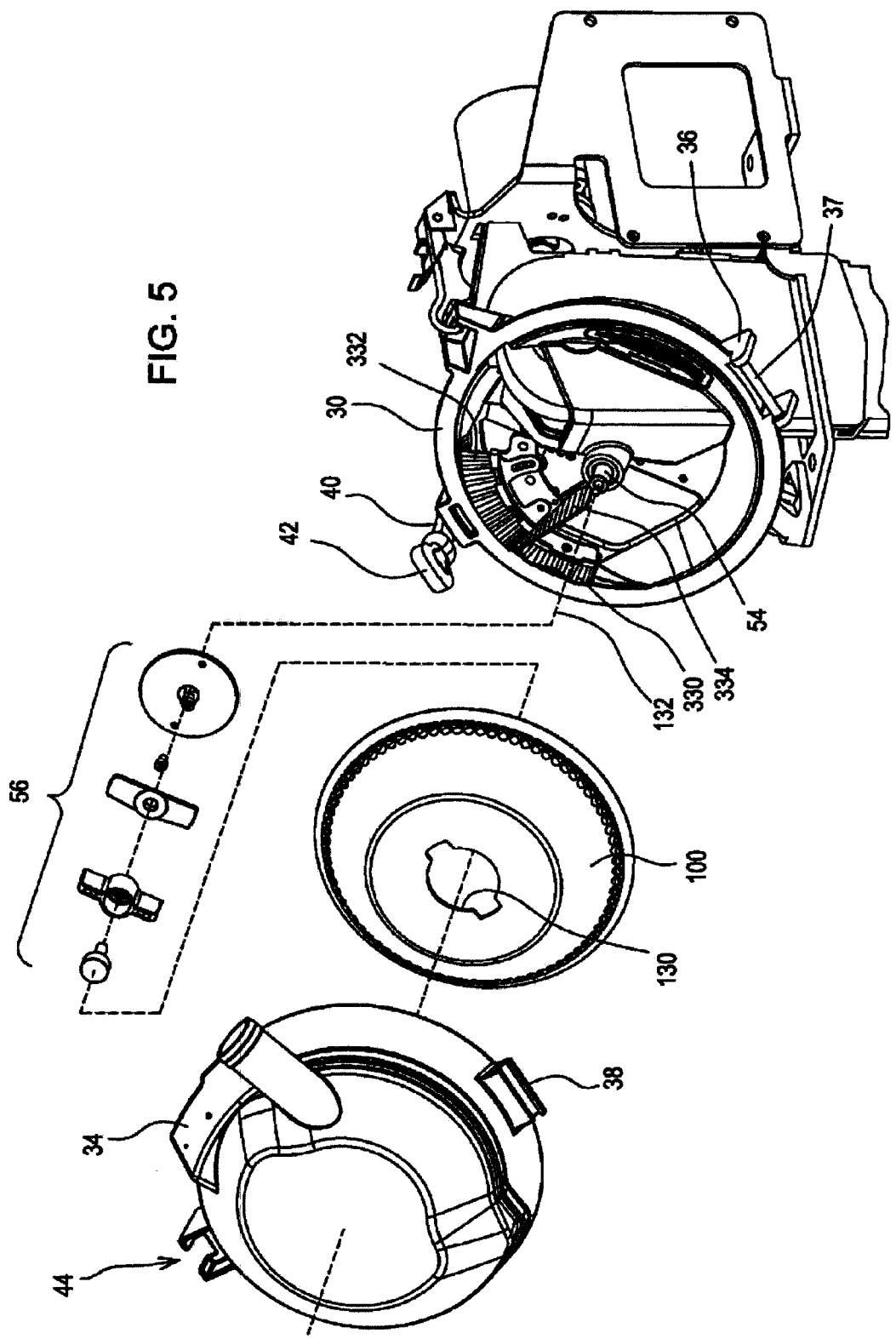
FIG. 5 is an exploded perspective view of the seed meter of FIG. 4.

It is possible that more than one seed will be adhered to a given aperture 114. To prevent more than one seed at a time from being transferred to the brush belt, a pair of doubles eliminators or singulators are attached to the housing 30 along the path of seed from the seed pool to the release position 164. The singulators are in the form of brushes 330 and 332 (FIGS. 5 and 9). Brush 330 has bristles extending substantially axially and brushes seed on the apertures 114 by extending inwardly from the outer edge 106 of the metering member. The bristles of brush 330 are of varying length, to engage the seed at several discrete locations along the length of the brush 330. The brush 332 has bristles extending substantially radially and engaging the inner surface of the metering member sidewall inside of the paddles 116 and extend along the sidewall to the apertures 114. Both brushes 330 and 332 act to slightly disturb seed on the aperture and cause excess seed to fall off. Once removed, the excess seed falls back to the seed pool 120. The brushes can be fixed in position or they can be adjustable to change the degree to which the brushed disturb seed on the metering member. A third brush 334 is shown which extends generally radially of the metering member. The brush 334 serves to define a boundary to the seed pool 120. The brushes 330, 332 and 334 are mounted to the housing 30.

Returning again to FIG. 10, once seed is captured or trapped in the bristles 428, the delivery system controls the movement of seed from the seed meter to the discharge location. The seeds are held in the bristles such that the seeds can not move vertically relative to the bristles 428 or relative to other seeds in the delivery system. Particularly, during travel of the seeds along the vertical side of the delivery system, the seeds are held on at least the top and bottom of the seeds to prevent any relative movement between the seed and the brush belt. Thus, the relative position of the seeds to one another is not affected by dynamics of the planting unit while moving across a field. The seed is carried by the bristles from the upper opening 416 to the lower opening 418 with the movement of the seed controlled at all times from the upper opening to the lower opening. (As noted above, other orientations may also be possible. As such, opening 416 may be generally viewed as an inlet opening, and 418 may be generally viewed as an exit opening for delivery system 400.)

The lower opening 418 of the delivery system housing is positioned as close to the bottom 446 of the seed trench or furrow 448 as possible. As shown, the lower opening 418 is near or below the soil surface 432 adjacent the seed furrow. The bottom of the delivery system should be no more than one or two inches, (2.5-5 cm) above the soil surface 432. If possible, the lower end of the delivery system should be below the soil surface 432. The housing edge wall 410 forms an exit ramp 434 at the lower opening 418. The lower opening 418 and the ramp 434 are positioned along the curve in the belt path around the pulley 422. The seed, being carried by the bristle's distal ends, increases in linear speed around the pulley 422 as the distal ends of the bristles travel a greater distance around the pulley 422 than does the base member 426 of the belt. This speed difference is shown by the two arrows 440 and 442.

At discharge, the seed has a velocity shown by the vector V. This velocity has a vertical component $V_v$ and a horizontal component $V_H$. The belt is operated at a speed to produce a horizontal velocity component $V_H$ that is approximately equal to, but in the opposite direction of, the seeding machine forward velocity shown by arrow 408. As a result, the horizontal velocity of the seed relative to the ground is zero or approximately zero. This minimizes rolling of the seed in the seed trench.

Seed can be inserted into the brush bristles at essentially an infinite number of positions. This enables the brush to be operated at the speed necessary to produce the desired horizontal velocity component to the seed, independent of the seed population. The seed meter, on the other hand, must be operated at a speed that is a function of both the forward travel speed of the seeding machine and the desired seed population.

Because the belt 424 can be loaded with seed at essentially an infinite number of positions, the belt speed can be operated independently of the seed meter speed. This is not the case with other seed delivery systems, such as that disclosed in U.S. Pat. No. 6,681,706 where the delivery system of FIG. 2 has a belt with flights to carry the seed. The belt speed must be timed to the seed meter speed to ensure that one or more flights pass the seed meter for each seed that is discharged from the meter.

While it is desirable to match the seed rearward velocity to the seeding machine forward velocity to minimize seed relative velocity to the soil, with some seed types, it may be necessary to operate the brush belt at a different speed to ensure the seed is discharged from the brush bristles.

Figure 19:
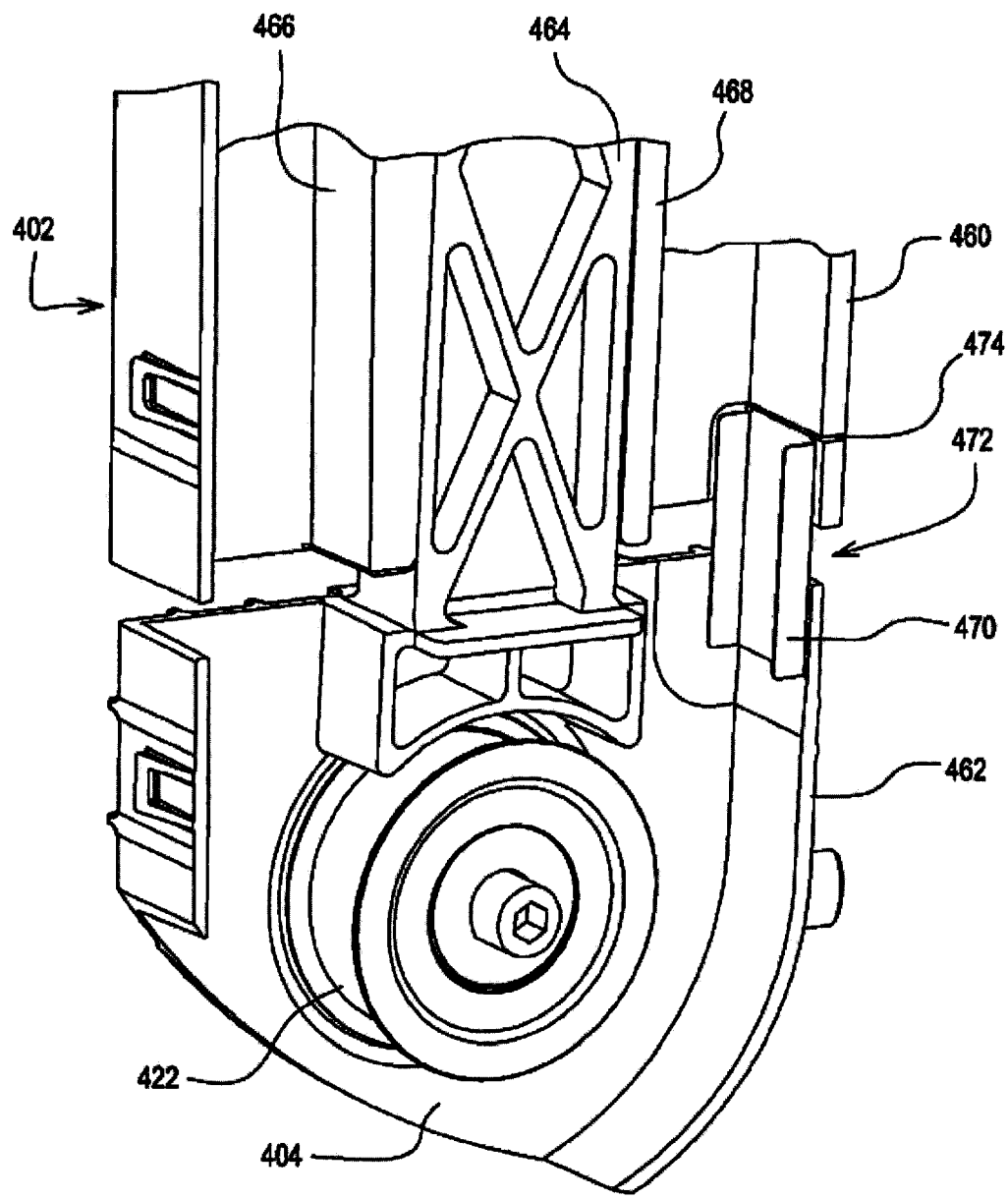
FIG. 19 is a perspective view of the lower end of the delivery system.

The interior of the lower portion of delivery system housing is shown in FIG. 19. The delivery system housing 402 is a two-piece housing having an upper housing member 460 and a lower housing member 462. The lower housing member carries the lower pulley 422. The lower housing member has an upwardly extending rod portion 464 that slides within a channel formed by walls 466 and 468 in the upper housing member. Springs, not shown, push downward on the rod portion 464 to bias the lower housing member downward. The brush belt 424, wrapped about the pulleys 420 and 422, holds the upper and lower housing members together. The belt 424 is tensioned by the springs acting on the rod portion 464. A U-shaped metal strip 470 is attached to the upper housing member 460 and bridges the gap 472 between the upper and lower housing members to provide a continuous surface for holding seed in the housing between the upper opening 416 and the lower opening 418. The metal strip has a tab at the upper end thereof bent over and inserted into a slot 474 in the upper housing member 460 to hold the metal strip 470 in place. If needed, a fastener, such as a nut and bolt, may be placed through the rod portion 464 and the upper housing member 460 to fix the upper and lower housing members together.

Figure 20:
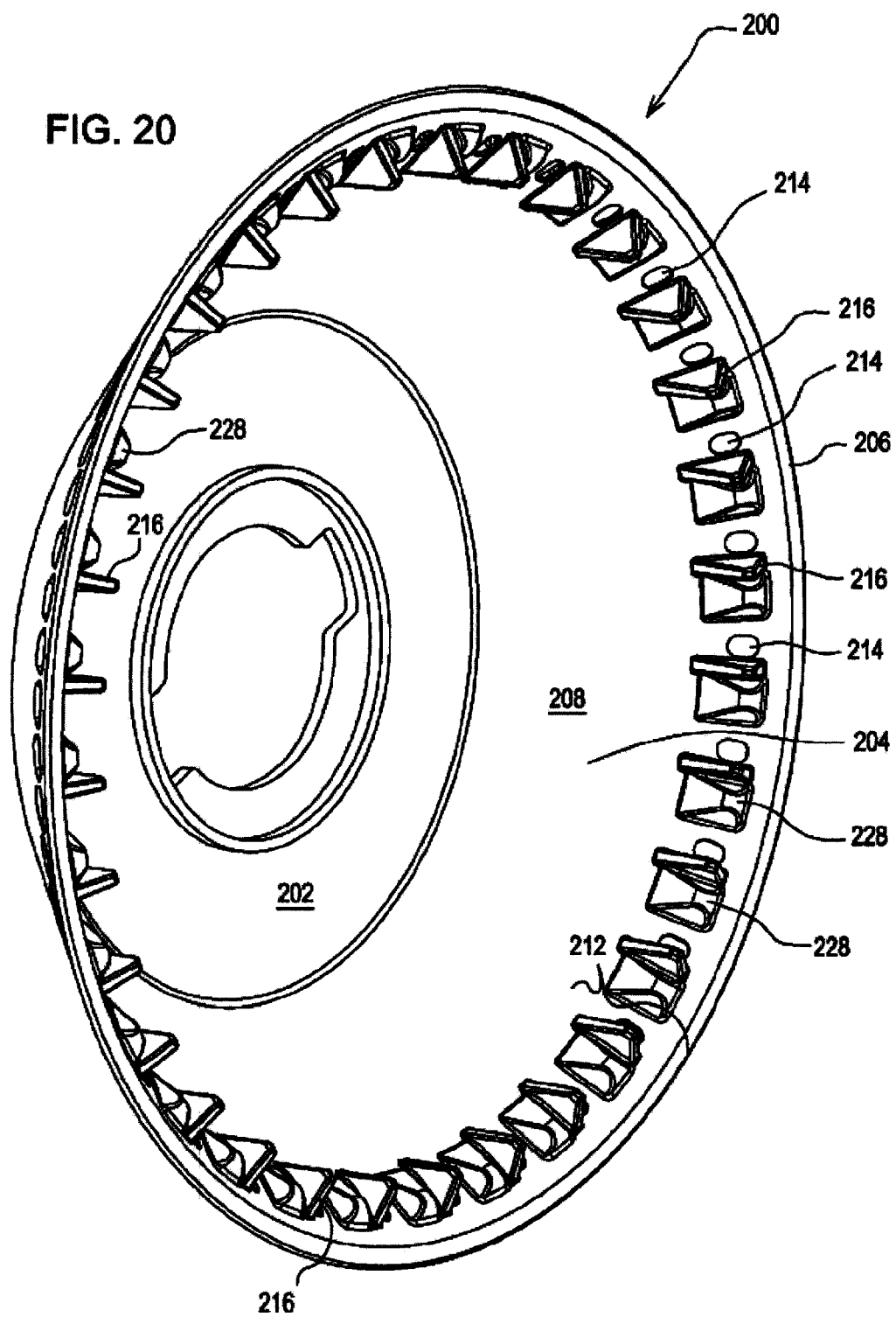
FIGS. 20 and 21 are perspective views of an alternative metering member.
Figure 21:
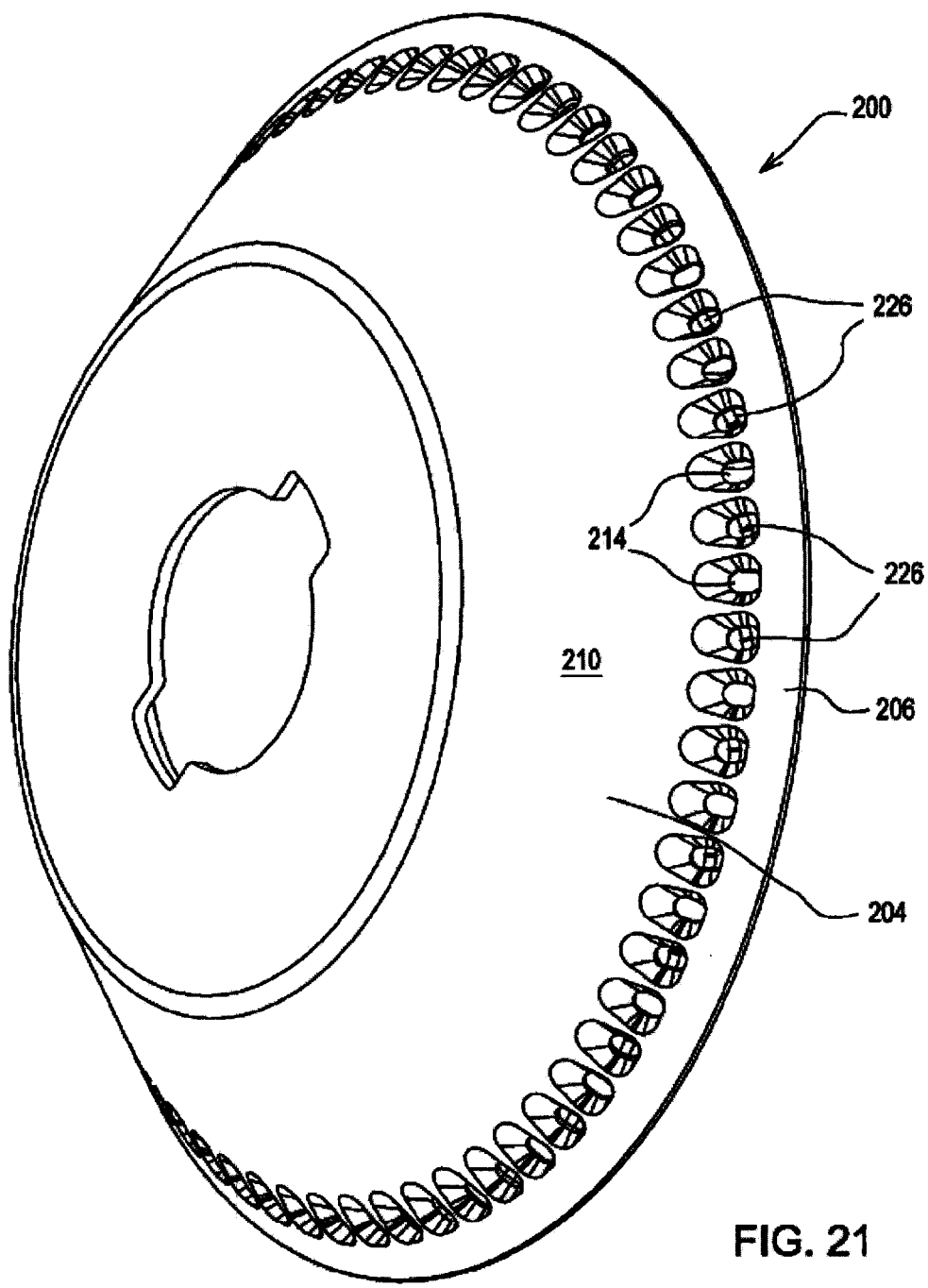
Figure 22:
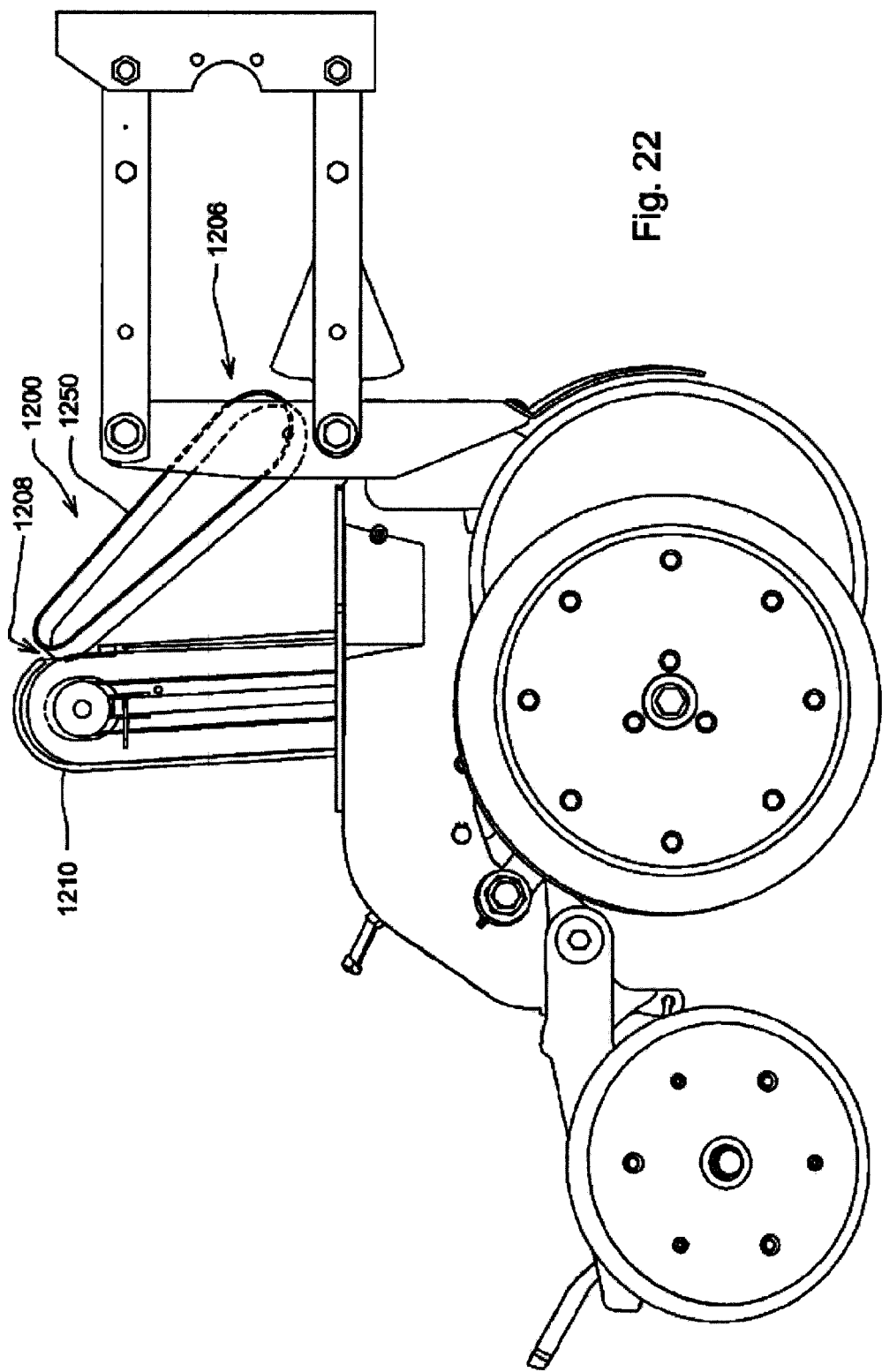
FIG. 22 is a schematic side view of another arrangement of the seed meter and seed delivery system.
Figure 23:
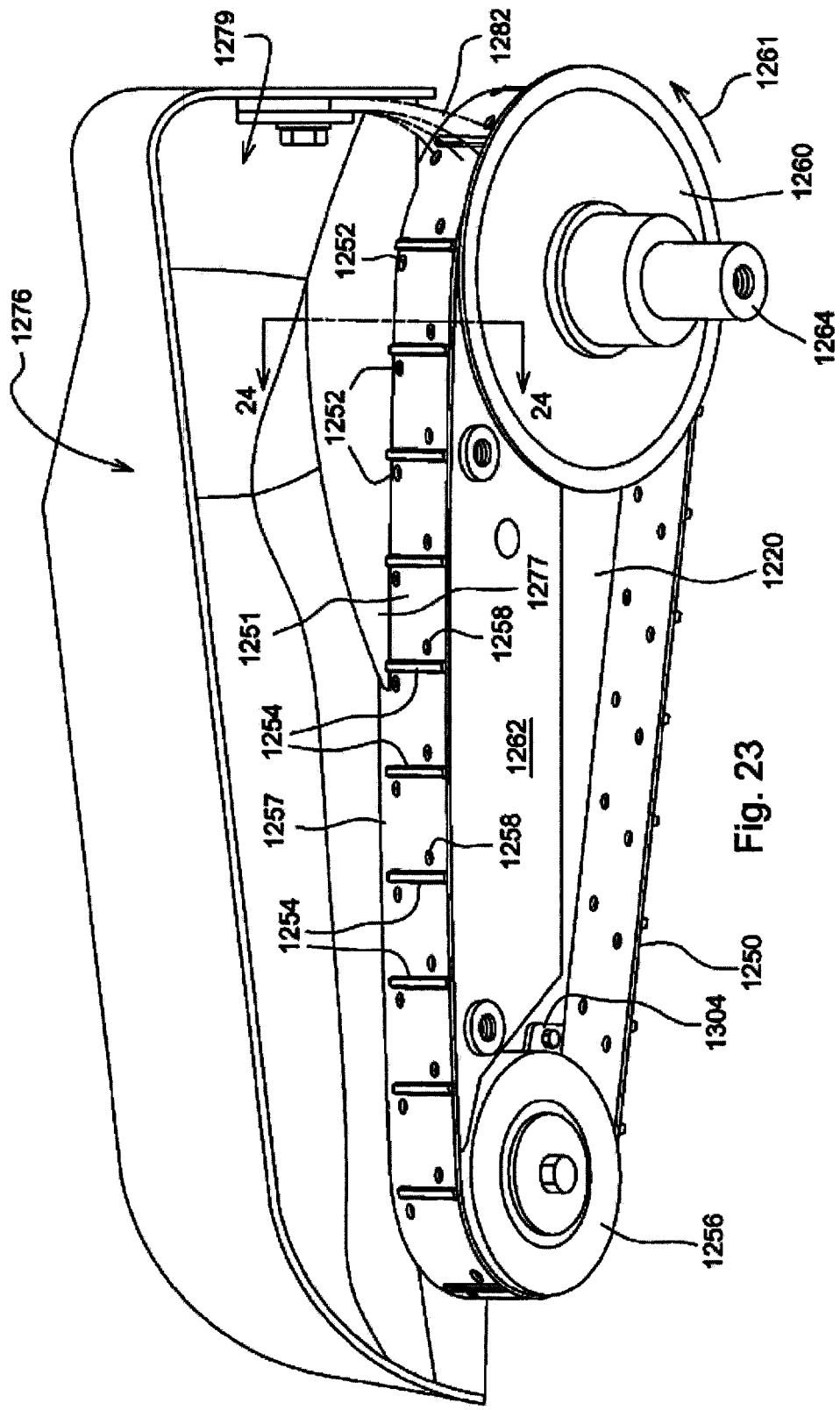
FIG. 23 is a perspective view of the seed meter of FIG. 22 partially disassembled.
Figure 24:
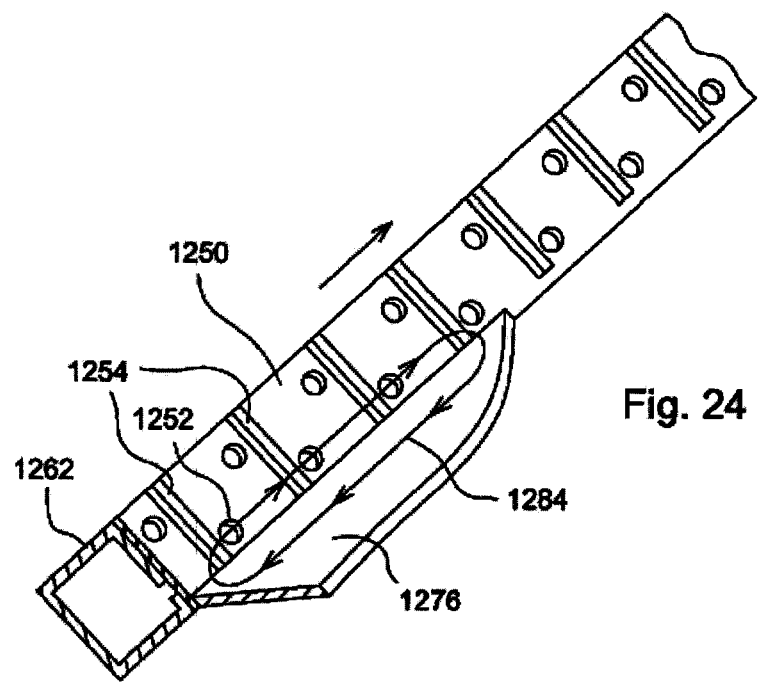
FIG. 24 is perspective view of the seed meter as seen along the line 24-24 of FIG. 23.
Figure 25:
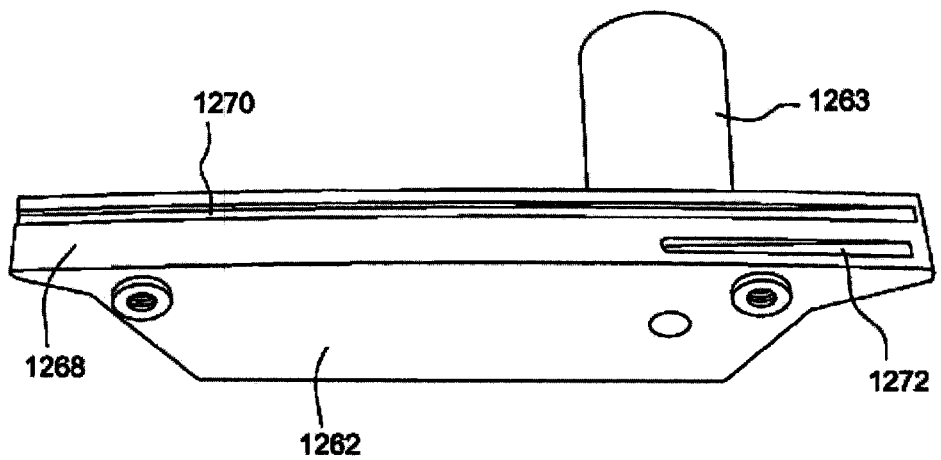
FIG. 25 is a perspective view of the vacuum manifold of the seed meter of FIG. 23.

Different metering members may be used for different seed types. The metering member 100 is intended for soybeans and other crops planted with a fairly close seed spacing. Corn, which is planted at a greater seed spacing uses a metering member 200 shown in FIGS. 20 and 21. Metering member 200 is constructed in a similar fashion as metering member 100 and like components are given the same reference numeral with the addition of 100. However, metering member 200 has half the number of apertures 214 as the metering member 100. To avoid the need to replace the ejector 166 when changing metering members, the metering member 200 has recess 226 extending into the sidewall 204 on the outer surface 210 of the sidewall between each aperture 214. The recesses 226 provide clearance for the projections 168 of the ejector 166 that are arranged to be inserted in each aperture 114 of the metering member 100. The recesses 226 are not open to the inner surface 208 of the sidewall 204. Thus there are additional projections 228 on the inner surface of the sidewall 204 between the apertures 214. Alternatively, the projections 228 and the paddles 216 can be formed as a single projection extending from the inner surface 208.

The blocking member or guide is shown in another arrangement of the seed meter and delivery system described in connection with FIGS. 22-31 from the parent application, U.S. patent application Ser. No. 12/363,968, filed Feb. 2, 2009. with reference to FIG. 22, a belt meter 1200 is shown schematically to illustrate the relationship of the belt 1250 relative to the row unit structure. The belt 1250 lies in a plane that is inclined relative to all three axes, that is the plane of the belt is inclined relative to a vertical fore and aft plane, inclined relative to a vertical transverse plane and inclined relative to a horizontal plane. Furthermore, the seed pickup region 1206 is positioned at the lower end of the belt 1250 while the seed release position or location 1208 is located at the upper end of the belt 1250. In the embodiment shown in FIG. 22, the seed is removed from the belt 1250 at the release location by a seed delivery system 1210. The seed delivery system 1210 is like seed delivery system 400 described above containing a brush belt 1312 to grip and carry seed. The seed delivery system 1210 moves the seed from the seed meter belt to the lower end of the row unit between the furrow opening disks where it is deposited into the furrow formed in the soil. The seed meter 1200 is described fully below with reference to FIGS. 23-30.

The seed meter 1200 has a frame member 1220 in the form of a plate which is mounted to the row unit frame in a suitable manner. The frame member 1220 supports the upper idler pulley 1256 and the lower drive pulley 1260 about which the belt 1250 is wrapped. A gearbox and drive motor (not shown) are coupled to the shaft 264 to drive the pulley 1260 and belt counterclockwise as viewed in FIG. 23 and shown by the arrow 1261. The frame member 1220 also carries a vacuum manifold 1262 having a hollow interior vacuum chamber 1266. A vacuum port 1263 extends from the opposite side of the vacuum chamber through the frame member 1220. The manifold 1262 has an outer wall 11268 (FIG. 25) containing a main slot 1270 extending the length of the outer wall. A secondary slot 11272 extends only a short portion of the length of the outer wall.

The belt 1250 has an outer seed engaging face or side 11251. The belt 1250 includes a row of first apertures 11252 which overlie the slot 1270 in the manifold 1262. The apertures 11252 to extend through the belt, allowing air to flow through the belt. The belt further has a plurality of features 11254 formed as ribs extending from the seed face 1251. The features 1254 each for a confronting face 1255 shown in FIG. 29 facing in the travel direction of the belt. In this embodiment, the feature 1254 forms the confronting face 1255 extending outward from the seed side 1251 of the belt. In the embodiment shown, the features 1254 do not extend laterally to both side edges of the belt, but leaves a flat edge zone 1257 along one edge of the belt. An optional second row of apertures 1258 in the belt are positioned to pass over the secondary slot 1272 in the manifold outer wall 1268. The apertures 1258 are only in communication with the vacuum chamber 1266 for the short portion of the path of the apertures 1258 over the slot 1272.

A housing 1276 is attached to the frame member 1220 and closely positioned to the belt 1250. A portion 1277 of the housing 1276 overlies the flat edge zone 1257 of the belt. The housing 1276, the belt 1250, and a cover 1278 (shown in FIG. 28) form a small chamber 1279 which holds a pool of seed 1280. A brush 1282 mounted to the housing 1276 sweeps across the face 1251 of the belt and seals the chamber 1279 at the location where the belt enters the chamber to prevent seed from escaping the chamber 1279. Seed enters in the chamber 1279 through a suitable port, not shown, in the housing 1276 or housing cover 1278.

The belt 1250 and housing 1276 form a V-shaped trough for the seed pool that extends uphill in the direction of belt travel. The confronting faces 1255 formed by the features 1254 of the belt engage the seed in the pool to agitate the seed creating a circular flow of seed as shown by the broken line 1284 of FIG. 24. Since the belt forms one side of the V-shaped trough, seed will always remain in contact with the belt regardless of tilt or inclination of the planter, as long as sufficient seed is present in the seed pool. An advantage of the seed meter is that when the vacuum shut off, seed on the belt falls back into the seed pool. This is in contrast to disk meters where a portion of the seed on the disk above the seed tube will fall to the ground upon vacuum shut-off.

Figure 26:
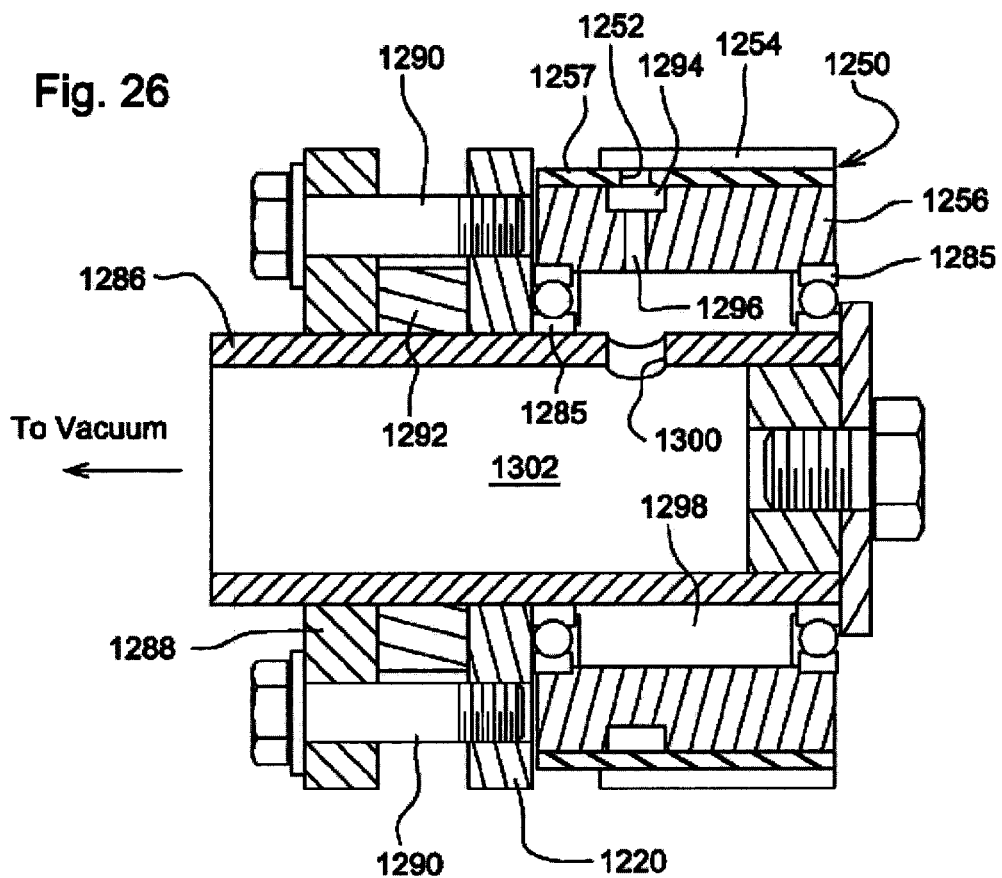
FIG. 26 is a sectional view of the idler pulley mounting structure of the seed meter of FIG. 23.
Figure 27:
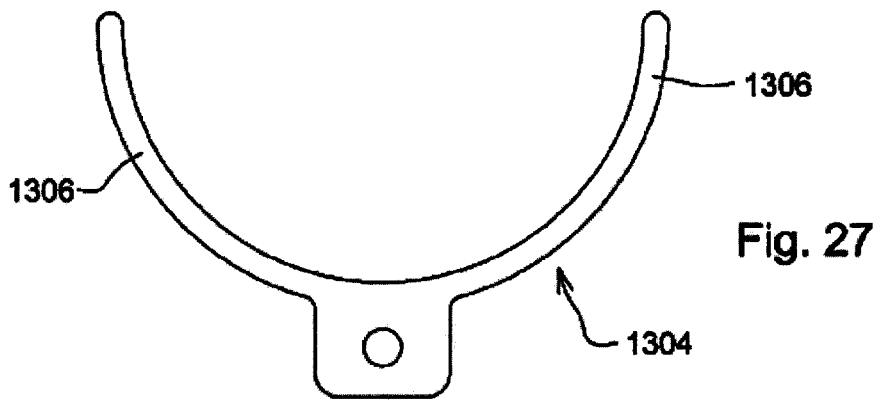
FIG. 27 is a plan view of a vacuum control member in the seed meter of FIG. 23.
Figure 28:
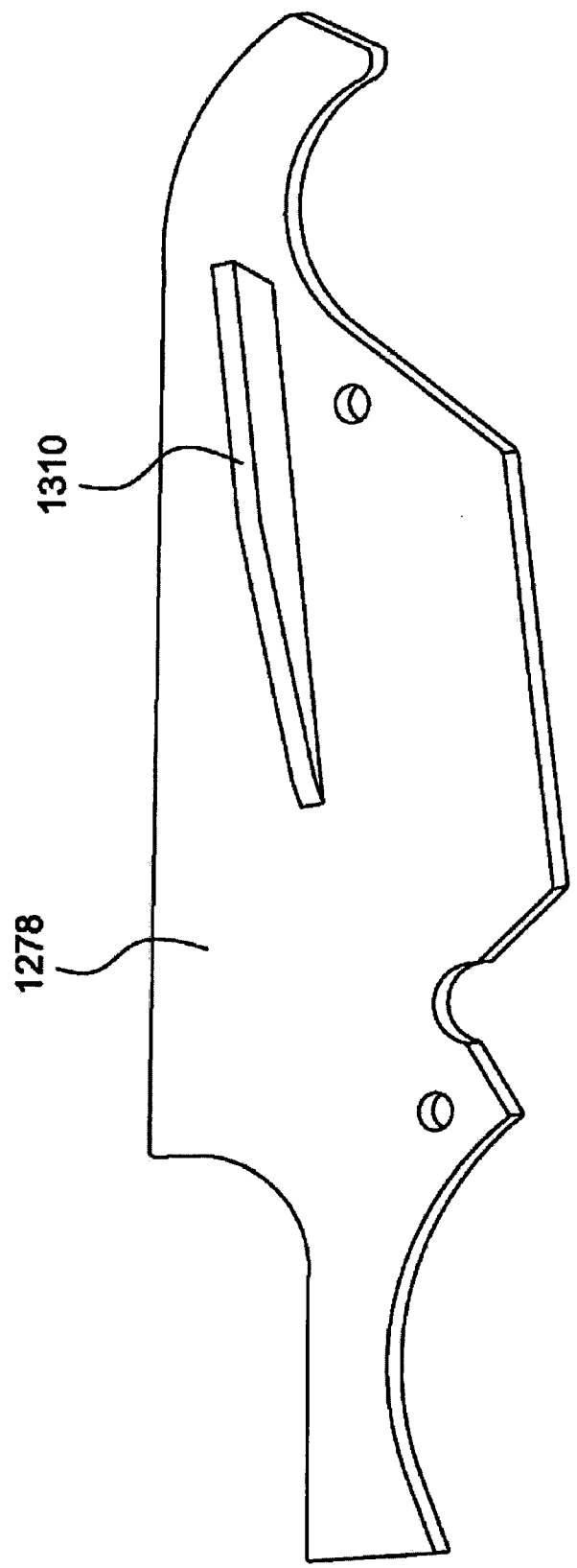
FIG. 28 is a perspective view of the seed meter housing cover of the seed meter of FIG. 23.

The idler pulley 1256 is supported by a bearing set 1285 on a tube 1286 (FIG. 26). A flange 1288 welded to the tube 1286 is attached to the frame member 1220 by bolts 1290. A spacer 1292 is positioned between the flange and frame member 1220. The idler pulley 1256 has a groove 1294 in its outer periphery which is in line with the belt apertures 1252. Channels 1296 extend radially through the pulley 1256 to an annular chamber 1298 surrounding the tube 1286. An opening 1300 in the tube 1286 provides communication between the chamber 1298 and the hollow interior 1302 of the tube. The tube is connected to the vacuum source whereby the vacuum is applied to the apertures 1252 in the belt as the belt travels over the pulley 1256. A fork 1304 is attached to the frame member 1220 with tines 1306 seated in the groove 1294 in the idler pulley. The tines filled the groove 1294 to cut off the vacuum and create the seed release location 1208. The tines 1306 extend from the seed release location to the vacuum manifold in the direction of rotation of the idler pulley to seal the vacuum chamber and the groove in the idler pulley.

Figure 29:
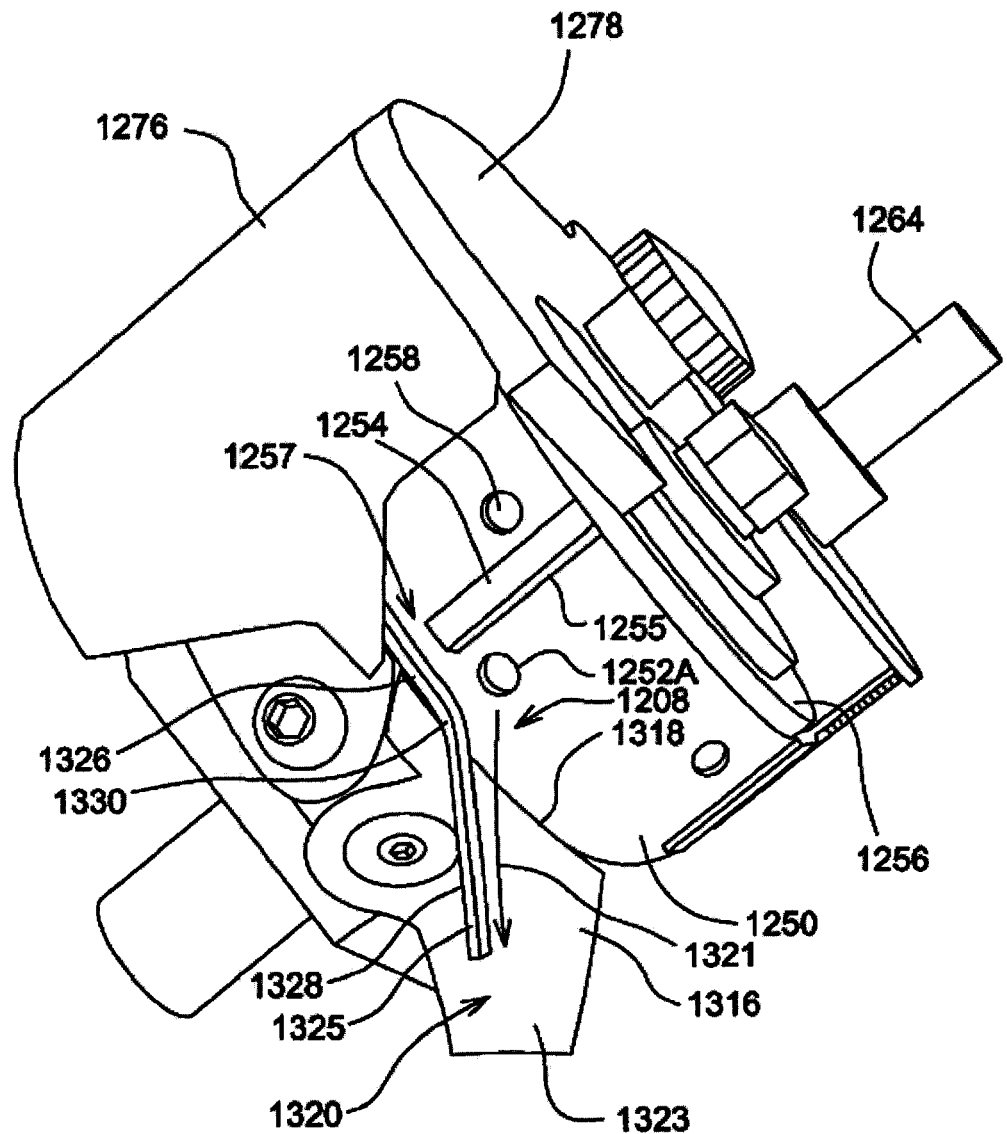
FIG. 29 is perspective view of the upper end of the seed meter of FIG. 23.
Figure 30:
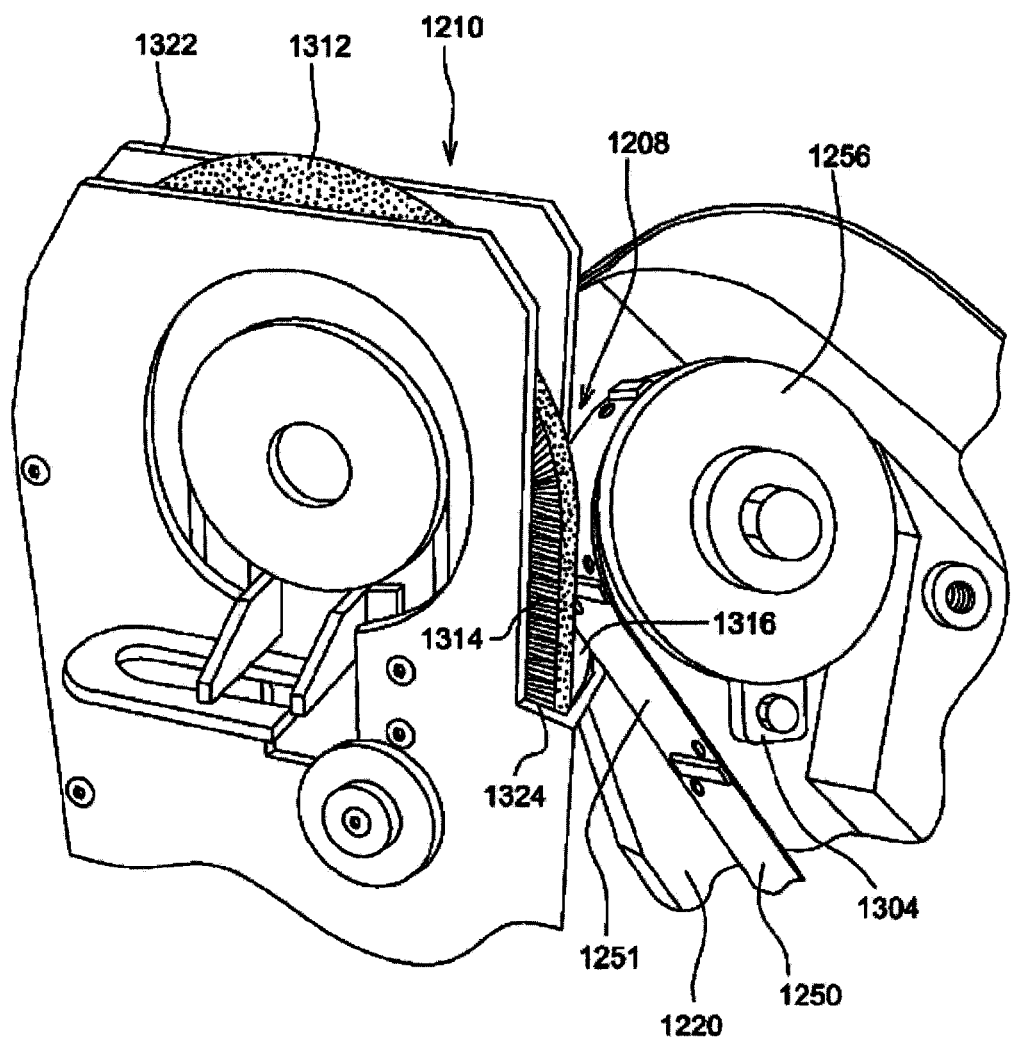
FIG. 30 is a perspective view showing the seed meter of FIG. 23 in relation to the seed deliver system.

The housing cover 1278 mounts to the manifold and covers the open side of the housing 1276 as shown in FIG. 29. A doubles eliminator 1310 is mounted to the housing cover and, when assembled, lies on top of the belt 1250. The doubles eliminator 1310 is roughly wedge-shaped and progressively increases in width in the travel direction of the belt to increase its coverage over the apertures 1252. The doubles eliminated 1310 causes doubles or multiples of seed to be removed from the belt resulting in a single seed covering each aperture 1252.

In operation, as the belt rotates, the confronting face 1255 engage and agitate seed in the seed pool at the bottom of the housing 1276. Seed from the seed pool will be adhered to the belt at each aperture 1252 due to the vacuum applied to the apertures from the interior of the manifold 1262 or by positive air pressure on the seed side of the belt. By virtue of the main slot 1270, the seeds will continue to be retained on the belt as the belt travels from the seed pick-up region 1206 to the idler pulley 1256. Due to the groove in the idler pulley, the vacuum is maintained on the apertures as the belt travels around the pulley until the seed and the aperture reaches the tine 1306 of the fork 1304. Upon reaching the tine 1306, the vacuum is terminated and the seed is released from the belt 1250. Alternatively, the seed can be mechanically removed from the belt or removed by a combination of vacuum termination and mechanical removal or the seeds can be removed mechanically while the vacuum is still applied.

The second row of apertures 1258 will also operate to retain a seed therein while the aperture 1258 travels over the shorter slot 1272. By picking up seed, the apertures 1258 act to further agitate the seed pool. In addition, when the apertures 1258 reach the downstream end 273 of the secondary slot 1272, the seed is released from the belt. The release location from the aperture 1258 causes the seed to pass over one of the apertures 1252 as the seed falls. If the aperture 1252 failed to pick-up a seed and is empty, the falling seed may be retained thereon. If the aperture 1252 is not empty, but instead picked-up multiple seeds, the falling seed may collide with the multiple seeds and assist in removing one or more of the multiple seeds. In this fashion, the falling seed operates to avoid errors in terms either no seed or multiple seeds on an aperture 1252.

At the seed release position 1208, the seed is transferred from the metering belt 1252 to the seed delivery system 1210. The seed delivery system 1210 includes an endless member also wrapped around pulleys and contained within a housing 1322. The housing has an upper opening 1324 through which seed is admitted into the delivery system. The endless member is shown in the form of a brush belt 1312 having bristles 1314 that sweep across the face 1251 of the belt 1250 to remove the seed therefrom. At the seed release position 1208, a transition plate 1316 is positioned adjacent the belt 1250. The transition plate has a curved first edge 1318 abutting the edge of the belt as the belt travels around the idler pulley. The brush belt bristles will engage a seed in the aperture 1252A at the location shown in FIG. 19 and will sweep the seed off the belt and across the face 1320 of the transition plate 1316 in the direction of the arrow 1321. The confronting face 1255 behind the aperture 1252A serves as a back stop to prevent the brush from knocking the seed off the metering belt. The confronting face 1255 pushes the seed into the brush bristles. The downward extending tab portion 1323 of the transition plate projects into the housing of the delivery system 1210 to allow the brush to continuously trap seed as the seed moves off the belt 1250, over the transition plate 1316 and into the interior of the delivery system housing where the seed is trapped by the brush bristles and the interior surface of the delivery system housing 1322. A guide 1325 projects from the surface of the transition plate to guide the seed and keep the seed from being swept off the meter belt prematurely. The guide forms an upstanding wall having a first portion 1326 adjacent the path of seed on the belt 1250 immediately prior to the release position 1208. A second portion 1328 of the upstanding wall extends in the direction of seed travel in the brush belt 1312. Seed must pass the corner or bend 1330 in the upstanding wall before it can be moved off the meter belt 1250 by the seed delivery system.

The guide 1325 and blocking member 162 ensure seed entry into the brush belt in a consistent manner and in the same location across the width of the brush belt. This consistent hand-off of seed from the seed meter to the seed delivery system helps to improve placement accuracy of the seed in the furrow in the soil.

As also noted above, certain seeding machines may include various different systems for transport of seed from a seed pool to a planting position. For example, a seed meter may include a metering member, which may transport seed from a seed pool around a generally circular (or other) seed path. At a release position in the seed path of the metering member, the seed may be ejected from the metering member for transport along a different path (e.g., in a different direction) by a seed delivery system.

In certain embodiments, a blocking member (or other transition member) may be included that assists in the hand-off of seed from the seed meter to the seed delivery system. For example, in a system in which a metering member (or other component of a seed meter) carries the seed in a first direction at (or near) a release position and a brush belt (or other pickup member) of the seed delivery system carries the seed in a second direction at (or near) the release position, a blocking member may include a blocking face to prevent transport of the seed in the second direction until the seed has reached an appropriate (e.g., downstream) portion of the brush belt bristles (or other pickup member).

Various example configurations discussed herein may include a blocking member (i.e., a transition member with a blocking face), but it will be understood that other configurations may also be possible, including configurations in which a transition member without a blocking face (or, without using a blocking face) assists in hand-off of the seed from the seed meter to a pickup member (e.g., a brush belt) of the delivery system. For example, a transition member may be provided that includes a first face along which seed is carried by the seed meter in the first direction. A pickup member of the delivery system may take seed from the seed meter near the transition member and transport the seed along the second direction into (and through) a transition recess through the transition member.

Because both the seed meter and the seed delivery system may include moving parts (e.g., the metering member and the bristles, respectively) in close proximity to the blocking member (or other transition member), it may be useful to provide a system for ensuring appropriate alignment of the blocking member with the seed meter and the seed delivery system. In certain embodiments, such an alignment system may include various complimentary protrusions (or projections) and recesses on the blocking member and various other associated structures (e.g., various housings or other components of the seed meter and seed delivery system). These complementary protrusions and recesses may be configured to be firmly seated together (or may be configured for other interlocking engagement) when the blocking member (or other transition member) is appropriately aligned. This may assist both in initial alignment of the various components noted above (e.g., through physical, visual or other alignment of the corresponding protrusions and recess) and in securing the various components in their aligned positions (e.g., through the contact forces between the protrusions and recesses when they are firmly seated together (or otherwise engaged with each other).

Figure 31:
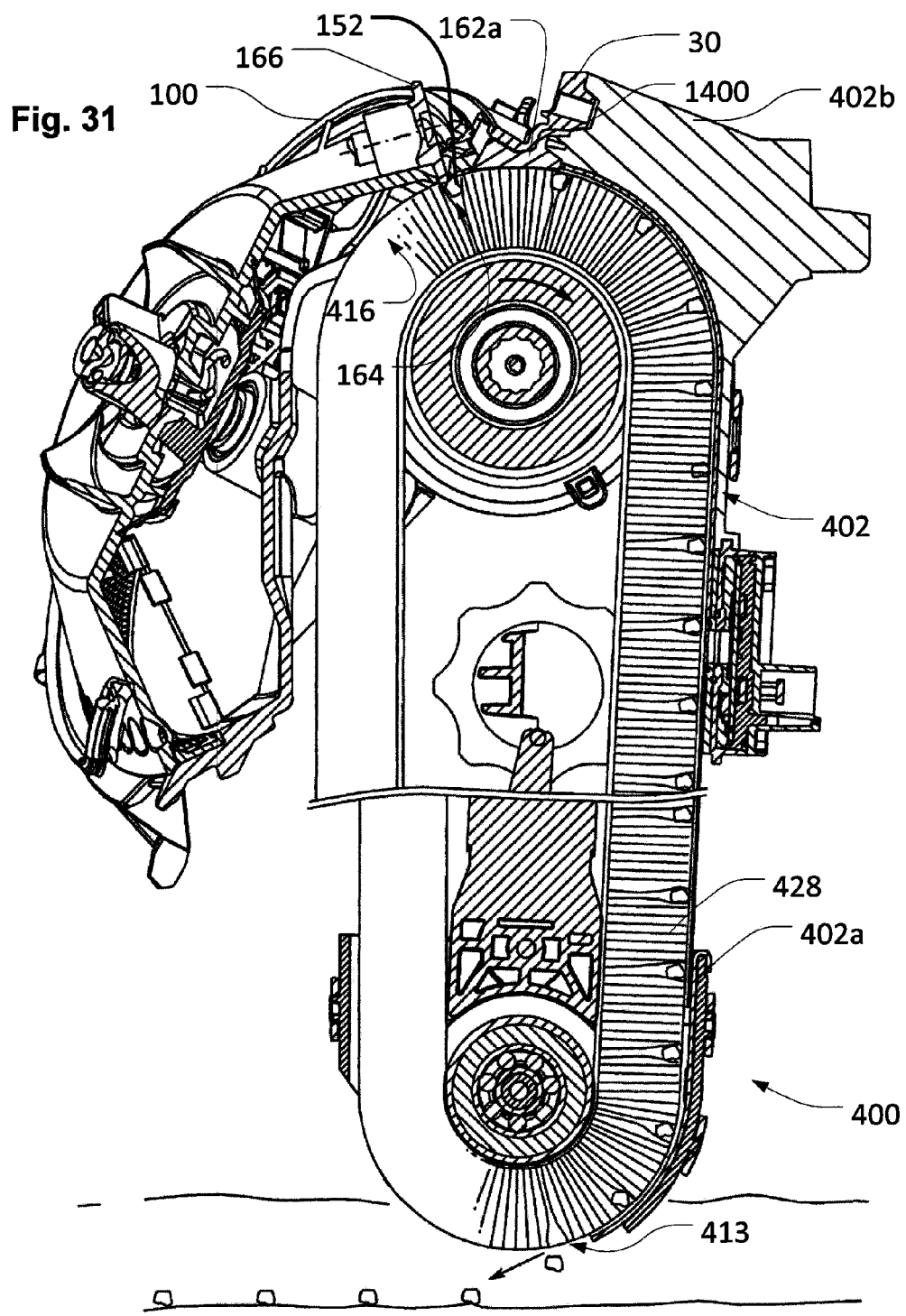
FIG. 31 is a side sectional view of another embodiment of the metering member and seed delivery system.
Figure 32:
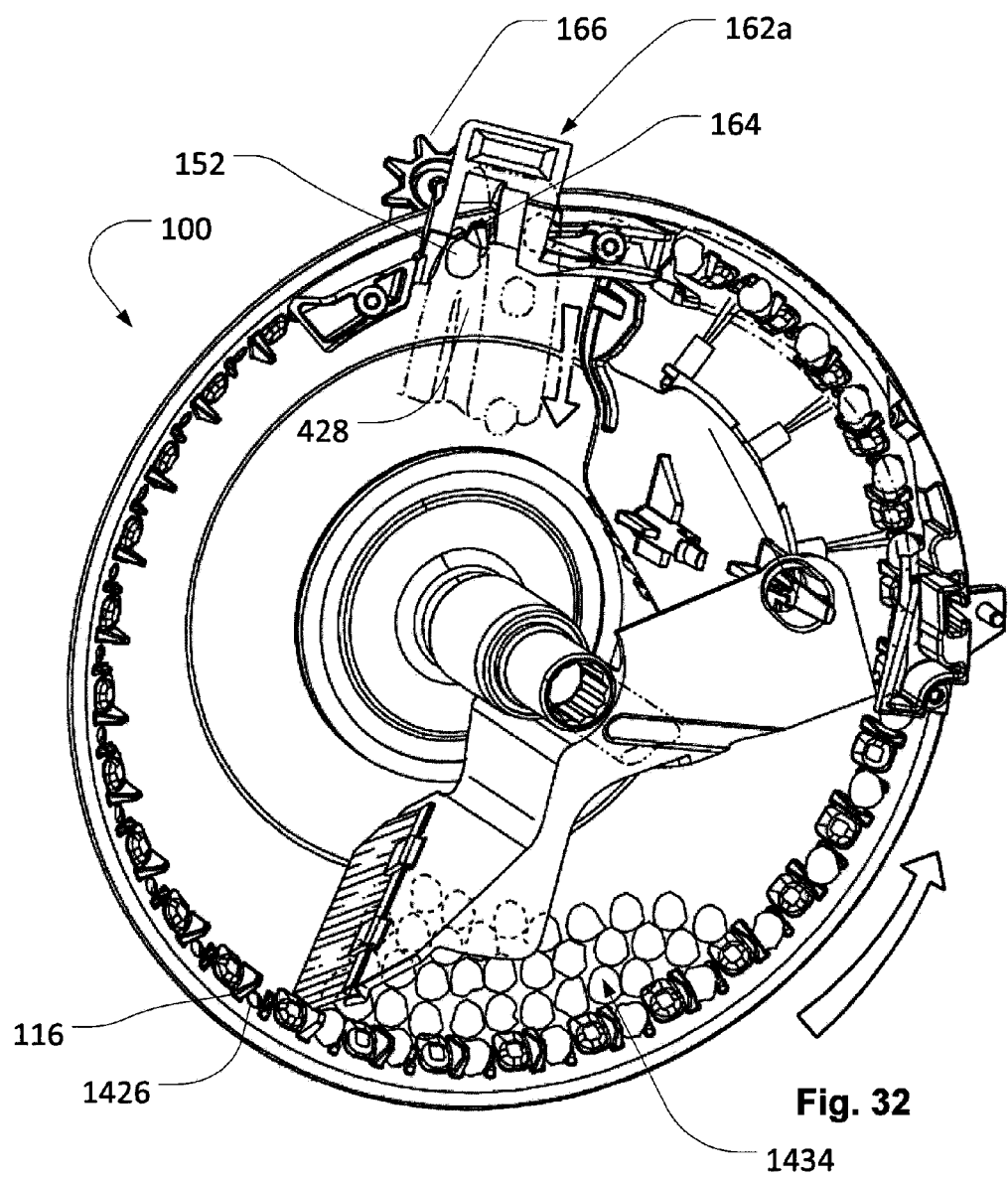
FIG. 32 an elevational view, taken from a first side of the metering member of FIG. 31, of certain internal components of the seed meter of FIG. 4, including a blocking member for the hand-off of seed from the seed meter to the seed delivery system.

Referring also to FIG. 31, in one embodiment of planting unit 14, delivery system 400 may include housing 402 partially enclosing bristles 428, which may generally travel in a clockwise direction (as depicted in FIG. 31) within housing 402. Upper opening 416 may be formed in housing 402 in order to allow seed to enter housing 402 (e.g., from metering member 100). Bristles 428 may extend through opening 416 in order to receive seed from metering member 100. As depicted in FIG. 31, housing 402 extends from the lower portion of delivery system 400 (i.e., housing portion 402a near discharge location 413) to the upper portion of delivery system 400 (i.e., housing portion 402b near interface 1400 with blocking member 162a and housing 30). It will be understood, in light of the discussion herein, that other housing configurations may also be possible. For example, housing portion 402b may not necessarily be a housing of delivery system 400, but may be a separate housing (or feature of planter unit 14). In such a case, for example, housing portion 402b may still be used (e.g., as described below) to assist in alignment of blocking member 162a with delivery system 400, particularly if housing portion 402b is fixed with respect to various portions of delivery system 400 (e.g., housing portion 402a, the path of travel of bristles 428, and so on). Referring also to FIG. 32, seed that is ejected from metering member 100 by ejector 166 at release position (or hand-off location) 164 (e.g., seed 152) may be swept by bristles 428 into delivery system 400.

Ejector 166 may ride on the outer surface of metering member 100, with projections from a star wheel on ejector 166 extending, sequentially, into apertures 114 in order to force seed out of apertures 114. Ejector 166, which may be biased against metering member 100 with a spring (not shown) may, accordingly, "walk" along metering member 100 such that successive projections of the star wheel sequentially eject seeds, at release position 164, from successive apertures 114. In various embodiments, blocking member 162a (like release position 164) may be located near the top of housing 402, near the interface between metering member 100 and bristles 428 of seed delivery system 400 (e.g., as can be seen in FIGS. 31 and 32).

Referring also to FIGS. 33-35, blocking member 162a may include upstream surface 1402 and blocking face 1404. Blocking member 162a may be mounted with respect to metering member 100 (not shown) and bristles 428 (not shown in FIG. 33, and depicted in dashed lines in FIGS. 34 and 35) such that metering member 100 carries seed (e.g., seed 152) along upstream surface 1402 onto blocking face 1404. At this point, seed 152 may be viewed as traveling in a first direction (e.g., may be carried by metering member 100 in the direction of arrow 1406 of FIG. 35), with bristles 428 traveling in a second direction (e.g., in a direction that is generally orthogonal to the first direction, such as generally into the page in FIG. 35, or out of the page in FIG. 34). A portion of bristles 428 may contact seed 152 when seed 152 is on blocking face 1404, but blocking face 1404 may prevent this portion of bristles 428 from carrying seed 152 in the second direction. Blocking face 1404 may also deflect this portion of bristles 428 for passage through blocking member 162a. As seed 152 passes edge 1408, however, blocking face 1404 may no longer prevent movement of seed 152 in the second direction (as shown, for example, in FIG. 35). At or near the same time, seed 152 may be ejected from metering member 100 by ejector 166 (e.g., at release position 164). Accordingly, a portion of bristles 428 may sweep seed 152 off of metering member 100 and into seed passage 1410, which may pass through blocking member 162a and into seed delivery system 400.

Referring also to FIGS. 36A and 36B, such a hand-off between metering member 100 and seed delivery system 400, as facilitated by blocking member 162a, is further illustrated. In FIGS. 36A and 36B, blocking member 162a and related components are depicted with seed 152 at release position 164. In FIG. 36B, a portion of bristles 428 have been removed in order to show various features of the system. As also noted above, a seed (e.g., seed 152) may be carried along upstream surface 1402 and across blocking face 1404 by metering member 100. As the seed passes edge 1408, the seed may be ejected from metering member 100 by ejector 166. At approximately the same time, because the seed may have passed edge 1408 of blocking face 1404, the seed may be carried into seed passage 1410 by bristles 428. (It will be understood that other timings may also be possible, such as, for example, if edge 1408 of blocking face 1404 is located elsewhere than immediately preceding (upstream of) release position 164.) Other configurations may also be possible, such as a system, for example, in which bristles 428 sweep seed off of metering member 100 in the opposite direction.

In light of the discussion above, it will be clear that proper alignment of metering member 100 with seed meter 24 and seed delivery system 400 may be important to optimal functioning of planting unit 14. For example, if upstream surface 1402 (or downstream surface 1412) are not properly aligned with metering member 100, various seed 80 may not be appropriately transported across upstream surface 1402 by metering member 100, or metering member 100 (or various features thereupon) may adversely interact with surface 1402 (or 1412) resulting in undesirable wear or other detrimental effects. Likewise, if seed passage 1410 is not appropriately aligned with bristles 428 this may result in excessive wear on bristles 428 or blocking member 162a, improper transport of seed 152 from metering member 100 through blocking member (and downstream thereof), or various other detrimental effects.

Figure 37:
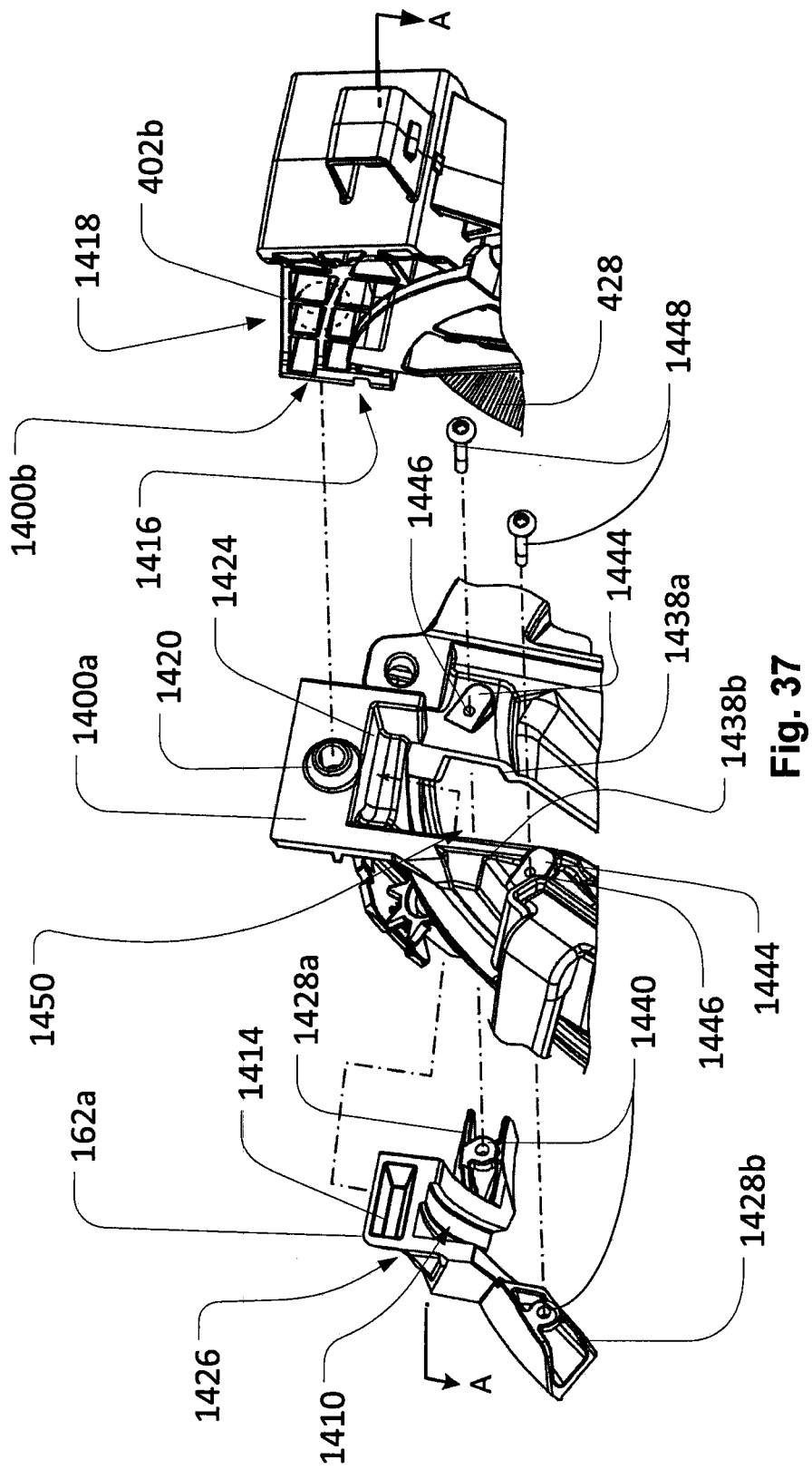
FIG. 37 is an exploded perspective view of the mounting of the blocking member of FIG. 33 to various components of the planting unit of FIG. 2.

Referring again to FIGS. 33-35 and also to FIGS. 37 and 38, example configurations of blocking member 162a, housing 30 and housing 402 are depicted, which may assist in appropriately aligning blocking member 162a with respect to housing 30 and housing 402. In certain embodiments, blocking member 162a may include various alignment features at or near interface 1400 between housings 30 and 402. For example, Such features, including the examples discussed below, may help to ensure that upstream surface 1402 (and downstream surface 1412) is appropriately aligned with metering member 100. This may in turn help to ensure that seed is appropriately carried across upstream surface 1402 to seed passage 1410. Likewise, various alignment features may help to ensure that seed passage 1410 (and other features of blocking member 162a) is appropriately aligned with bristles 428 (and other features of seed delivery system 400). This may, among other benefits, reduce wear on bristles 428 and blocking member 162a, and generally improve the functioning of planter unit 14.

This discussion may include discussion of various particular features and configurations of blocking member 162a and related components and systems of planting unit 14. It will be understood that various alternative alignment features and configurations may be implemented with respect to housings 30 and 402 or with respect to similar other features of planting unlit 14. Such features and configurations may, for example, be implemented or included in order to appropriately align blocking member 162a with various components of planting unit 14 (e.g., metering member 100, bristles 428, and so on) or for other alignment purposes. For example, various alignment features or configurations may be implemented on (e.g., machined on, manufacture into, mounted onto, and so on) housings 30 and 402 and related components, or may be implemented on various other housings or features of planting unit 14 (e.g., other housings or features with fixed or determinate orientation with respect to metering member 100, blocking member 162a, bristles 428, and so on). Similarly, in various embodiments, the alignment features or configurations discussed herein may be implemented in order to align various components of planting unit 14 other than metering member 100, blocking member 162a, bristles 428, and so on.

As depicted in various figures, interface 1400 may be an interface at which both housing 30 and blocking member 162a meet housing 402 (e.g., at upper portion 402b of housing 402). Also as depicted, interface 1400 may not necessarily be a planar interface, but may instead include various geometry extending into and out of the main bodies of housing 30, housing 402, blocking member 92 or other related components. Other configurations may also be possible. For example, interface 1400 may be viewed as an interface of only housing 30 with housing 402, only blocking member 92 with housing 402, or various combinations thereof.

In certain embodiments, recess 1414 may be provided on blocking member 162a, with a corresponding protrusion 1416 on housing 402. Recess 1414, for example, may be configured as a trapezoidal recess (e.g., as shown in FIGS. 33 and 34), and protrusion 1416 may be configured as a correspondingly contoured trapezoidal protrusion (e.g., as shown in FIG. 38). With blocking member 162a appropriately aligned with metering member 100 and bristles 428, recess 1414 may extend away from interface 1400 on the side of interface 1400 that includes housing 30 (indicated as interface side 1400a). Protrusion 1416 may extend into interface 1400 from the side of interface 1400 that includes housing 402 (or another housing) (indicated as interface side 1400b). Protrusion 1416 may be oriented with respect to interface 1400 such that when blocking member 162a is appropriately aligned within planter unit 14 and housings 30 and 402 (or other housings) are held together in an operational configuration, protrusion 1416 may be seated firmly within recess 1414 (i.e., seated so as not to allow vertical or lateral movement of blocking member 162a with respect to housing 402 or another housing or mounting component of planter unit 14). In this way, when recess 1414 and protrusion 1416 are appropriately aligned (e.g., when housings 30 and 402 are held together for operation of planter unit 14), this may assist in appropriately aligning blocking member 162a with respect to various components of planter unit 14. Other configurations may also be possible, including configurations with frustoconical or other geometries in protrusion 1416 and corresponding recess 1414, and configurations in which the locations of protrusion 1416 and recess 1414 are reversed (or otherwise altered).

In certain embodiments, housing 402 (or another housing) may also include recess 1418, with a corresponding protrusion 1420 provided on housing 30. Recess 1418, for example, may be configured as a frustoconical recess (e.g., as shown in FIG. 38), and protrusion 1420 may be configured as a correspondingly contoured frustoconical protrusion (e.g., as also shown in FIG. 38). As with regard to protrusion 1416 and recess 1414, as discussed above, protrusion 1420 and recess 1418 may also assist in appropriately aligning housing 402 (or another housing) with housing 30, which may in turn assist in appropriately aligning blocking member 162a (which may be mounted to housing 30) with respect to various components of planter unit 14. Other configurations may also be possible, such configurations including trapezoidal or other geometries in protrusion 1420 and recess 1418, and configurations in which the locations of protrusion 1420 and recess 1418 are reversed (or otherwise altered).

In certain embodiments, protrusion 1420 may also assist in aligning latch 70 (e.g., as shown in FIG. 2) or another means for securing housing 30 to housing 402. For example, protrusion 1420 may include recess 1422 (e.g., as depicted in FIG. 39) which may extend into protrusion 1416 from the side of housing 30 that is opposite interface 1400. As shown in FIG. 2, for example, recess 1422 may serve as a seat for the curved end of latch 70 (or the end of another connecting device for securing housing 30 and 402 together). In this way, protrusion 1416 and recess 1422 may further serve to align housings 30 and 402, while also assisting to secure housings 30 and 402 together.

In certain embodiments, recessed geometry 1424 may also be provided on housing 30, with corresponding mounting geometry 1426 provided on blocking member 162a. As can be seen, for example, in FIGS. 35, 37, and 39, mounting geometry 1426 may be a generally curved (or chamfered, angled or otherwise contoured) geometry, which may be oriented above and opposite seed passage 1410. Due to the corresponding contours of recessed geometry 1424 and mounting geometry 1426, when mounting geometry 1426 is seated firmly in recessed geometry 1424 this may further serve to ensure appropriate alignment of blocking member 162a with respect to various components of planter unit 14.

In certain embodiments, other alignment features may also be provided. For example, blocking member 162a may include one or more side extensions 1428, which be configured to be seated firmly within one or more corresponding recesses in housing 30. As depicted in FIGS. 33-35, for example, upstream side extension 1428a may include walls 1430 and 1432, which may taper together as they extend away from upstream surface 1402. Likewise, downstream side extension 1428b may include walls 1434 and 1436, which may taper together as they extend away from downstream surface 1412. As depicted in FIGS. 37 and 38, housing 30 may include correspondingly tapered recesses 1438a and 1438b. As with various features discussed above, when blocking member 162a is appropriately aligned (e.g., with metering member 100 and bristles 428), side extensions 1428 (via the tapering of walls 1430, 1432, 1434 and 1436) may be firmly seated within recesses 1438, thereby further securing blocking member 162a with respect to housing 30, and so on.

In certain embodiments, additional means may be provided to secure blocking member 162a in place. For example, bosses 1440 with pin or screw holes 1442 may be provided in side extensions 1428 of blocking member 162a. Further, bosses 1444 with corresponding pin or screw holes 1446 may be provided in housing 30. When blocking member 162a is appropriately aligned, holes 1442 may align with holes 1446 such that pins 1448 may be inserted to further secure blocking member 162a in place.

In certain embodiments, side extensions 1428 and mounting geometry 1426 on blocking member 162a, and recessed geometry 1424 on housing 30 may cooperatively serve to secure blocking member 162a in place with respect to housing 30. For example, as can be by the dotted assembly lines in FIG. 37 and the left-side assembly in FIG. 38, in order to mount blocking member 162a to housing 30, the portion of blocking member 162a with mounting geometry 1426 may be inserted through opening 1450 of housing 30 such that mounting geometry 1426 is seated in recessed geometry 1424, and the outer rim of recess 1414 of blocking member 162a is at (or near) interface 1400a. In contrast, side extensions 1428 may remain on the other side of opening 1450, such that a portion of housing 30 (i.e., the walls of recesses 1438) is interposed between side extensions 1428 and interface 1400a. In this way, recessed geometry 1424 of housing 30 may physically impede movement of blocking member 162a away from interface 1400a while recesses 1438 may physically impede movement of blocking member 162a toward interface 1400a.

As noted above, various other configurations may be possible while staying within the bounds of this disclosure. For example, various recesses, protrusions or geometries discussed herein may be configured with various alternative contours, shapes, and so on. Likewise, although various example recesses, protrusions, or geometries have been described as included in particular components of planter unit 14, such recesses, protrusions, or geometries may be included on other components. For example, various protrusions or recesses may be included on a housing of planter unit 14 other than housings 30 and 402, or on various other relatively fixed components that may likewise serve to appropriately align blocking member 162a.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. An alignment system for fixing the relative position of a seed meter with respect to a delivery system at a hand-off location where seed traveling in a first direction of movement of the seed meter transitions to a second direction of movement of the delivery system, the alignment system comprising:
   a delivery system housing at least in part surrounding a moving pickup member of the delivery system, the pickup member moving the seed in the second direction;
   a transition member mounted to at least one of the seed meter and the delivery system housing, the transition member defining a transition recess receiving the pickup member of the delivery system as the pickup member moves in the second direction; and
   an interlocking arrangement having at least one alignment projection extending from at least one of the transition member and the delivery system housing, and a complementary at least one alignment recess formed in the other of the at least one of the transition member and the delivery system housing, the at least one alignment projection and alignment recess in interlocking engagement with each other;
   wherein the engagement of the at least one alignment projection with the at least one alignment recess positions the transition member in alignment with the first direction and positions the transition recess in alignment with the second direction.

2. The alignment system of claim 1, further comprising:
   another interlocking arrangement having at least one other alignment recess formed in at least one of the delivery system housing and the seed meter, and a complementary at least one other alignment projection extending from the other of the at least one of the delivery system housing and the seed meter, the at least one other alignment projection and other alignment recess being configured for interlocking engagement with each other.

3. The alignment system of claim 2, wherein the at least one other alignment recess includes a frustoconical recess.

4. The alignment system of claim 3, wherein the at least one other alignment projection includes a frustoconical projection.

5. The alignment system of claim 1, further comprising:
   a recessed geometry included in the at least one of the seed meter and the delivery system housing to which the transition member is mounted; and
   a complimentary mounting geometry on the transition member, the mounting geometry configured to seat firmly in the recessed geometry one or more of when the transition member is in alignment with the first direction and when the transition recess is in alignment with the second direction.

6. The alignment system of claim 1, wherein the at least one alignment recess includes a trapezoidal recess.

7. The alignment system of claim 6, wherein the at least one alignment projection includes a trapezoidal projection.

8. An alignment system for fixing the relative position of a seed meter with respect to a delivery system at a hand-off location where seed traveling in a first direction of movement of the seed meter transitions to a second direction of movement of the delivery system, the alignment system comprising:
- a delivery system housing at least in part surrounding a moving pickup member of the delivery system, the pickup member moving the seed in the second direction;
- a transition member mounted to at least one of the seed meter and the delivery system housing, the transition member defining a transition recess receiving the pickup member of the delivery system as the pickup member moves in the second direction;
- an interlocking arrangement having at least one alignment projection extending from at least one of the transition member and the delivery system housing, and a complementary at least one alignment recess formed in the other of the at least one of the transition member and the delivery system housing, the at least one alignment projection and alignment recess in interlocking engagement with each other, wherein the engagement of the at least one alignment projection with the at least one alignment recess positions the transition member in alignment with the first direction and positions the transition recess in alignment with the second direction;
- another interlocking arrangement having at least one other alignment recess formed in at least one of the delivery system housing and the seed meter, and a complementary at least one other alignment projection extending from the other of the at least one of the delivery system housing and the seed meter, the at least one other alignment projection and other alignment recess being configured for interlocking engagement with each other; and
- an outer recess extending into the other alignment projection from a side of the other alignment projection that is removed from an interface between the other alignment projection and the other alignment recess, the outer recess configured to receive a latch to secure the delivery system housing to the seed meter.

9. An alignment system for fixing the relative position of a seed meter with respect to a delivery system at a hand-off location where seed traveling in a first direction of movement of the seed meter transitions to a second direction of movement of the delivery system, the alignment system comprising:
- a delivery system housing at least in part surrounding a moving pickup member of the delivery system, the pickup member moving the seed in the second direction;
- a transition member mounted to at least one of the seed meter and the delivery system housing, the transition member defining a transition recess receiving the pickup member of the delivery system as the pickup member moves in the second direction; and
- an interlocking arrangement having at least one alignment projection extending from at least one of the transition member and the delivery system housing, and a complementary at least one alignment recess formed in the other of the at least one of the transition member and the delivery system housing, the at least one alignment projection and alignment recess being in interlocking engagement with each other, wherein the engagement of the at least one alignment projection with the at least one alignment recess positions the transition member in alignment with the first direction and positions the transition recess in alignment with the second direction;
- wherein the seed meter includes at least one tapered recess;
- wherein the transition member includes at least one side extension, a first side of the at least one side extension providing a face along which the seed is moved in the first direction by the seed meter, and a second side of the at least one side extension providing a tapered geometry extending away from the first side of the at least one side extension;
- wherein the at least one tapered recess and the tapered geometry are configured for interlocking engagement with each other; and
- wherein the engagement of the at least one tapered recess with the tapered geometry positions the transition member in alignment with the first direction and positions the transition recess in alignment with the second direction.

10. The alignment system of claim 9, wherein the at least one side extension of the transition member includes at least one mounting hole to mount the transition member to at least one of the seed meter and the delivery system housing.

* * * * *